US010420432B1

United States Patent
Krawczyk et al.

(10) Patent No.: US 10,420,432 B1
(45) Date of Patent: Sep. 24, 2019

(54) BEVERAGE SERVER HAVING INTEGRAL AIR VENT

(71) Applicant: Service Ideas, Incorporated, Woodbury, MN (US)

(72) Inventors: Joseph J. Krawczyk, Hugo, MN (US); Benjamin A. Van Voorhis, St. Paul, MN (US); Thomas A. Wendt, Colfax, WI (US); Ronald E. Rezachek, Eagan, MN (US)

(73) Assignee: Service Ideas, Incorporated, Woodbury, MN (US)

( * ) Notice: Subject to any disclaimer, the term of this patent is extended or adjusted under 35 U.S.C. 154(b) by 0 days.

(21) Appl. No.: 16/104,684

(22) Filed: Aug. 17, 2018

Related U.S. Application Data

(60) Provisional application No. 62/548,016, filed on Aug. 21, 2017.

(51) Int. Cl.
*A47G 19/00* (2006.01)
*A47G 19/12* (2006.01)
*B65D 47/32* (2006.01)

(52) U.S. Cl.
CPC .............. *A47G 19/12* (2013.01); *A47G 19/00* (2013.01); *B65D 47/32* (2013.01)

(58) Field of Classification Search
CPC ......... A47G 19/00; A47G 19/12; B65D 47/32
See application file for complete search history.

(56) References Cited

U.S. PATENT DOCUMENTS

| 4,526,797 | A | * | 7/1985 | Stone, Jr. | A47G 19/14 220/256.1 |
| 4,921,146 | A |   | 5/1990 | Salzmann | |
| 5,072,858 | A | * | 12/1991 | Brashier | A47G 19/12 222/144.5 |
| 5,240,145 | A | * | 8/1993 | Hogberg | A47G 19/12 222/131 |
| 5,243,194 | A |   | 9/1993 | Sano et al. | |
| 5,303,850 | A | * | 4/1994 | Connan | B65D 47/263 215/253 |
| 5,497,917 | A |   | 3/1996 | Krimmel et al. | |

(Continued)

OTHER PUBLICATIONS

Service Ideas, Inc., Aeroserve 2.0 Care and Handling Recommendations, published on Aug. 22, 2016 by Service Ideas, Inc., Woodbury, MN.

*Primary Examiner* — Frederick C Nicolas
(74) *Attorney, Agent, or Firm* — Robert C. Freed; Dykema Gossett PLLC

(57) ABSTRACT

A beverage server having a cap and a server body. The server body includes an open top container having a handle, a chamber, a pour spout, and a cap receiving portion defining a top opening. The cap is rotatably positionable within the top opening between an on-off configuration, a closed configuration, and a pour configuration. The cap has an outer facing portion and a lip, and the cap receiving portion has an inner facing portion adjacent to a top rim. Surfaces on the cap that would otherwise engage the rim and surfaces of the cap receiving portion, are cutaway to create recesses in such surfaces, which together with the top rim and surfaces of the cap receiving portion define an air vent which allows air to pass into the chamber when beverage is dispensed from the chamber via the spout when the cap is in the pour configuration.

32 Claims, 25 Drawing Sheets

(56) References Cited

U.S. PATENT DOCUMENTS

| | | | |
|---|---|---|---|
| 5,513,780 A | 5/1996 | Buono | |
| 5,653,362 A | 8/1997 | Patel | |
| 5,988,457 A | 11/1999 | Andrew et al. | |
| D439,631 S | 3/2001 | Crescenzi et al. | |
| 6,234,364 B1 * | 5/2001 | Nybakke | A47G 19/12 222/469 |
| D446,419 S | 8/2001 | Ming-Shiue | |
| D455,044 S | 4/2002 | Nybakke | |
| 6,398,083 B2 | 6/2002 | Nybakke | |
| D471,767 S | 3/2003 | Ucar Cortes et al. | |
| D475,233 S | 6/2003 | De Visser | |
| D526,159 S | 8/2006 | Schmidt | |
| D544,288 S | 6/2007 | Berlencourt | |
| D555,416 S | 11/2007 | Bodum | |
| D587,512 S | 3/2009 | Dorney et al. | |
| D593,790 S | 6/2009 | Lin | |
| D607,684 S | 1/2010 | Elissen | |
| D607,685 S | 1/2010 | Elissen | |
| D607,686 S | 1/2010 | Elissen | |
| D621,648 S | 8/2010 | Lown et al. | |
| D622,102 S | 8/2010 | Wahl | |
| D630,463 S | 1/2011 | Picozza et al. | |
| D640,084 S | 6/2011 | Sheppard et al. | |
| D646,932 S | 10/2011 | Melms | |
| D651,446 S | 1/2012 | Sheppard et al. | |
| D661,939 S | 6/2012 | Kern et al. | |
| D688,094 S | 8/2013 | Arnold et al. | |
| 9,016,518 B2 | 4/2015 | Poul et al. | |
| D737,619 S | 9/2015 | Cornu et al. | |
| D747,130 S | 1/2016 | Kunz | |
| D788,511 S | 6/2017 | Powell | |
| D806,511 S | 1/2018 | Yuan | |
| D808,243 S | 1/2018 | Clements et al. | |
| 2001/0036124 A1 | 11/2001 | Rubenstein | |
| 2016/0287002 A1 | 10/2016 | Van Breugel et al. | |

* cited by examiner

BEVERAGE SERVER HAVING INTEGRAL AIR VENT

CROSS-REFERENCE TO RELATED APPLICATIONS

The present is related to pending U.S. patent application Ser. No. 29/592,632, filed Jan. 31, 2017; pending U.S. patent application Ser. No. 29/592,633, filed Jan. 31, 2017; pending U.S. patent application Ser. No. 29/592,634, filed Jan. 31, 2017; pending U.S. patent application Ser. No. 29/592,635, filed Jan. 31, 2017; pending U.S. patent application Ser. No. 29/592,636, filed Jan. 31, 2017; pending U.S. patent application Ser. No. 29/592,637, filed Jan. 31, 2017; each entitled Beverage Server; the disclosures of each of which are hereby incorporated herein by reference. This application claims priority benefit, under 35 U.S.C. § 119(e), of U.S. Provisional Patent Application No. 62/548,016 filed Aug. 21, 2017, entitled "Folding Tonneau Cover Apparatus", which is incorporated herein by reference in its entirety.

FIELD OF THE INVENTION

The present invention relates generally to a beverage servers; specifically, beverage servers that are suited for use in the transportation industry, most particularly in airline use or in other situations where a server must be placed on a small space on a flat surface and moved from its place and then returned to the same limit place quite often during repeated use. More specifically, the present invention relates to a beverage server having a body and a multi-position cap, and having an air vent defined at least in part by the cap and a portion of the server body. The invention also relates to methods for making and using such a beverage server.

BACKGROUND OF THE DISCLOSURE

Pouring beverages during airline flights present unique challenges. Space is limited in passenger cabins and the aisle or aisles through the length of the passenger cabins are generally quite narrow, requiring space on food and beverage carts for serving passengers to be limited. As such, beverage servers used on such food and beverage carts will ideally occupy as little space as possible. In addition, aircraft and other passenger transporting vehicles often encounter areas of uneven ground surface, varying air pressure or air turbulence or other disturbances that act on the plane or other vehicle to produce abrupt elevation changes or other movements. These changes in surface level, pressure differences, or turbulence, can result in a bumpy ride for the passengers and make it difficult to pour beverages such as coffee or tea that are provided in beverage servers and also provide challenges with respect to the stability of the beverage servers when resting on the surfaces of serving carts. In heavy turbulence, food and beverage serving carts or beverage servers that are resting on a surface of such cart could actually tip over, making the retention functions of the beverage servers particularly important.

Therefore, it is an object of the present invention to provide a stable beverage server having a low center of gravity and therefore relatively resistant to tipping over. It is another object of the invention to provide a beverage server having a cap that is easily placed onto and removed from the server body yet remains securely in place on the server body. It is a further object of the invention to provide a cap for a beverage server that can selectively open or close a pour spout in the beverage server so as to prevent accidental spills. It is a still further object of the invention to provide a beverage server having a vent which provides for inflow of air into the server as a beverage is being dispensed through the pour spout.

These and other objectives and advantages of the invention will appear more fully from the following description, made in conjunction with the accompanying drawings wherein like reference characters refer to the same or similar parts throughout the several views.

SUMMARY OF THE INVENTION

The present invention includes a vented beverage server 10 for retaining a liquid beverage including 1) a server body 12 having an open top container 22 defining a chamber 30 for receiving and retaining the beverage or liquid beverage 4; the open top container 22 having a top portion 18 and a base portion 19, the top portion 18 including a top rim 20, a cap receiving portion 34 and a pour spout 28; the pour spout 28 including a spout passageway 29a for dispensing the liquid beverage 4 from the chamber 30, and the cap receiving portion 34 defining a top opening 32; and 2) a cap 58 for engagement within the top opening 32; the cap 58 having a cap lip 64 and the cap lip 64 having an underside surface 65; wherein the underside surface 65 of the cap lip 64 is constructed and arranged to engage the top rim 20 when the cap 58 is engaged within the top opening 32 in a pour configuration so as to restrict air 6 from flowing between the underside surface 65 and the top rim 20; wherein, when the cap 58 is engaged within the top opening 32 in the pour configuration, the cap 58 will be positioned so that liquid beverage 4 in the chamber 30 can pass into the spout passageway 29a and out of the server 10 through the pour spout 28; wherein the cap 58 includes a lip projection recess 80a in the underside surface 65 of the cap lip 64; wherein the lip projection recess 80a cooperates with top rim 20 to define in part an air vent 92 that allows air 6 to pass into the chamber 30 from outside of the server 10 when the cap 58 is in the pour configuration and the server body 12 is oriented so that liquid beverage 4 will flow out of the chamber 30 and through the spout passageway 29a under the force of gravity. In preferred embodiments, the cap receiving portion 34 is constructed and arranged to retain the cap 58 within the top opening 32 in one of three configurations selected from the group consisting of: 1) an on-off configuration wherein the cap can be positioned in a first engaged position in which the cap can be removed from the top opening; 2) a closed configuration in which the cap prevents liquid beverage in the chamber from passing out of the chamber into the spout passageway; and 3) a pour configuration in which the cap is positioned so that liquid beverage in the chamber can pass into the spout passageway and out of the server through the pour spout. The cap receiving portion 34 preferably further includes an inner facing portion 36 having a raised closing surface 38 and the cap 58 has a cap skirt 66; wherein the cap receiving portion 34 further includes an inner facing portion 36 having a raised closing surface 38; and wherein the raised closing surface 38 includes an inner surface 43 of a protruding ring 42 that encircles the top opening 32; the cap skirt 66 has an outer facing surface 68 and the outer facing surface 68 of the cap skirt 66 has a clearance region 85 and a closing region 86; and the closing region 86 of the outer facing surface 68 is constructed and arranged to engage the raised closing surface 38 of the inner facing portion 36 so as to restrict air 6 from passing between the closing region 86 of the outer facing surface 68 of the cap skirt 66 and the raised closing surface 38 when the cap 58 is engaged within the top opening 32 in a pour configuration. The cap 58 preferably includes a skirt projection recess 80b in the closing region and the clearance region of the outer facing surface of the cap skirt and the skirt projection recess 80b cooperates with the raised closing surface 38 to further define the air vent 92 that allows air 6 to pass into the chamber 30 from outside of the server 10 when the cap 58 is engaged in the cap receiving portion 34 in the pour configuration. Methods of providing such a vented beverage server and also serving a beverage with such a vented beverage server are also provided.

These and various other objects, advantages and features of novelty which characterize the present invention are pointed out with particularity in the claims annexed hereto and forming a part hereof. However, for a better understanding of the invention, its advantages and objects obtained by its use, reference should be made to the drawings which form a further part hereof, and to the accompanying descriptive matter, in which there is illustrated and described a preferred embodiment of the present invention.

BRIEF DESCRIPTION OF THE DRAWINGS

In the drawings, in which corresponding reference numerals and letters indicate corresponding parts of the various embodiments throughout the several views, and in which the various embodiments generally differ only in the manner described and/or shown herein.

DETAILED DESCRIPTION

Figure 1:
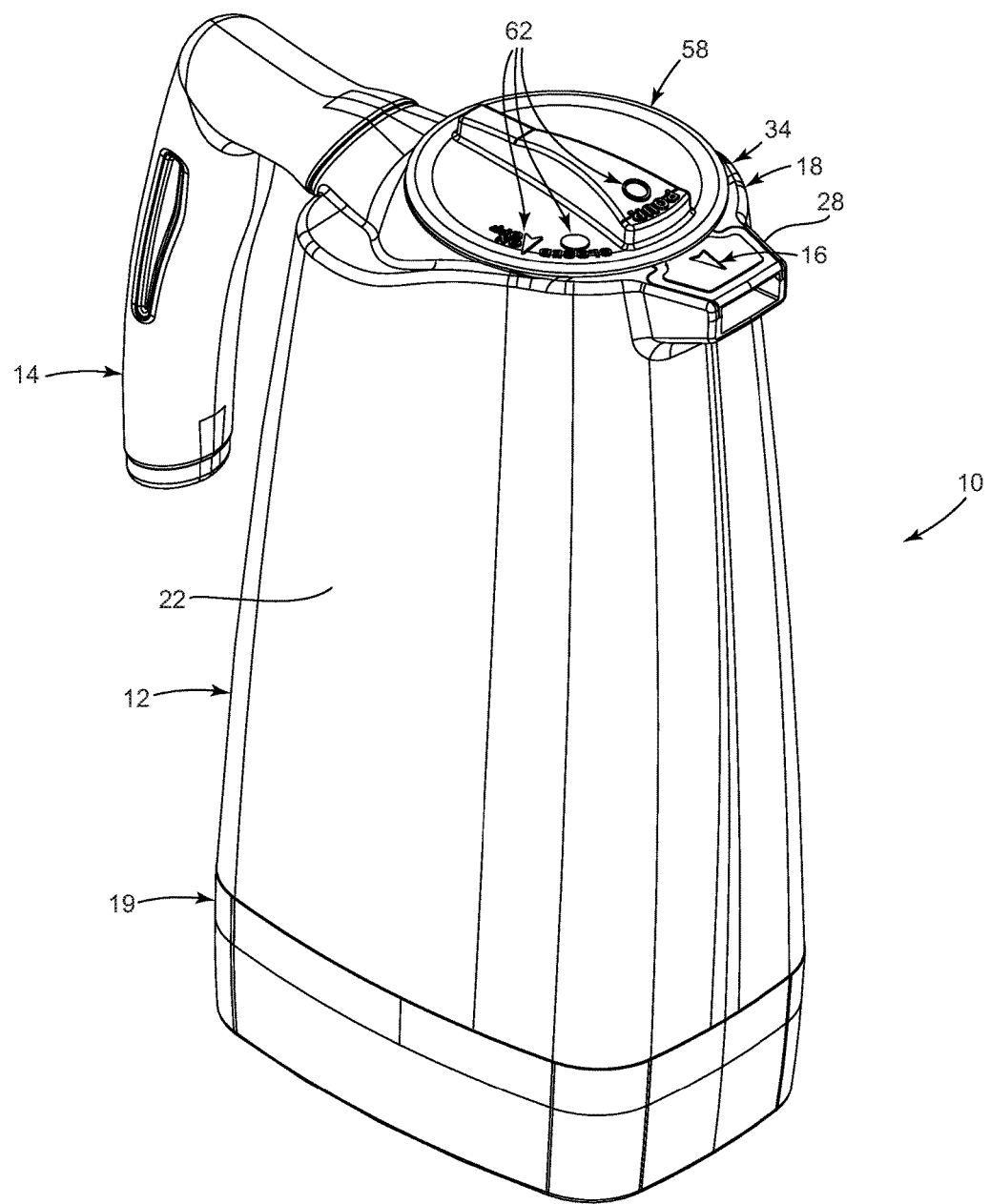
FIG. 1 is a perspective view of a preferred beverage server of the present invention, illustrating a server body, a handle, a pour spout, and a cap, shown in a "pour" configuration in which beverage can be dispensed from the beverage server via the pour spout.

Referring now to FIGS. 1-15; in which there is illustrated a beverage server 10 of the present invention; the preferred beverage server 10 includes a server body 12 and a cap or lid 58 for engagement within a top opening 32. The server body 12 includes a container 22 having a cap receiving portion 34 that defines the top opening 32 (or cap receiving opening 32). The container 22 includes a top portion 18 that includes the cap receiving portion 34 and a base portion 19 including a bottom 25 that includes a bottom rim 21. The bottom rim 21 preferably provides a surface or a series of surfaces that can cooperate to rest solidly without rocking from side to side on a planar surface such as a beverage cart (not shown) of the kind known to be used in the commercial aviation industry. The container also defines a chamber 30 for receiving and retaining beverage or liquid beverage or beverage fluid 4. Note that the beverage 4 will generally include a liquid, but can also include frozen liquids with suspended solids or gases, or mixtures or combinations thereof, including for example liquid with flavored solid particles or ice, or liquid with carbonation gas, and so forth. The cap 58 can be engaged within the top opening 32 defined by the cap receiving portion 34 of the container 22 to cover the top opening 32, and can be removed from container 22 to facilitate access to the chamber 30 via the top opening 32 such as for filling or emptying the chamber 30. The container 22 includes a pour spout 28 or spout 28 for dispensing beverage or liquid beverage 4 from the beverage server 10. The server body 12 preferably includes a handle 14 interconnected with the container 22. Although it is not required, the server body 12 will preferably include a body orientation indicator 16 proximate the top portion 18 of the container 22 to aid in orienting the cap 58, which will include cap orientation indicators 62, so that when the cap 58 is engaged within the cap receiving portion 34 and the top opening 32, the cap 58 will cooperate with the container 22 to function in a certain way.

Figure 2:
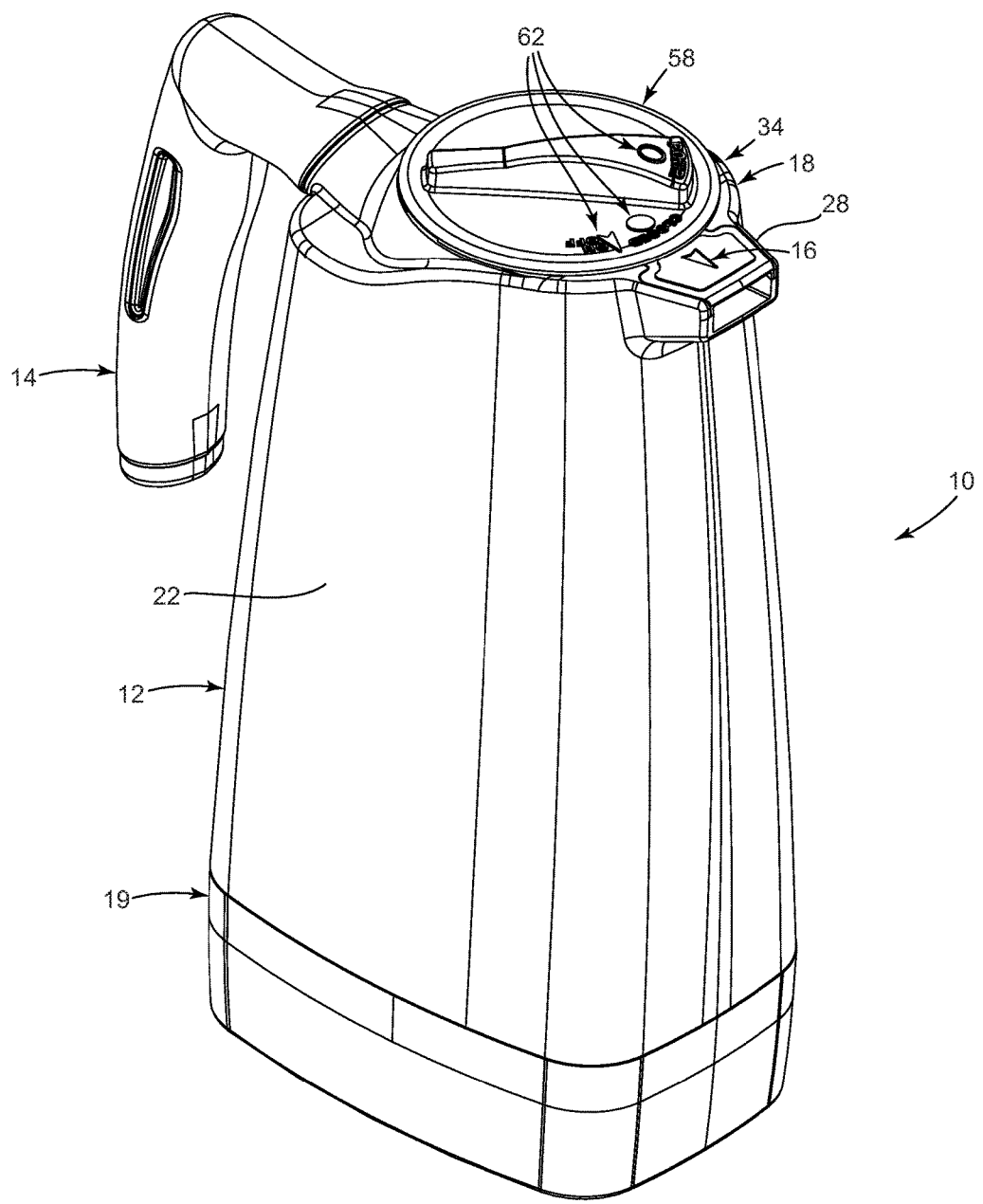
FIG. 2 is a perspective view of the beverage server shown in FIG. 1, except that the cap is shown in a "closed" configuration in which access to the spout is blocked to prevent beverage from being dispensed via the pour spout.
Figure 3:
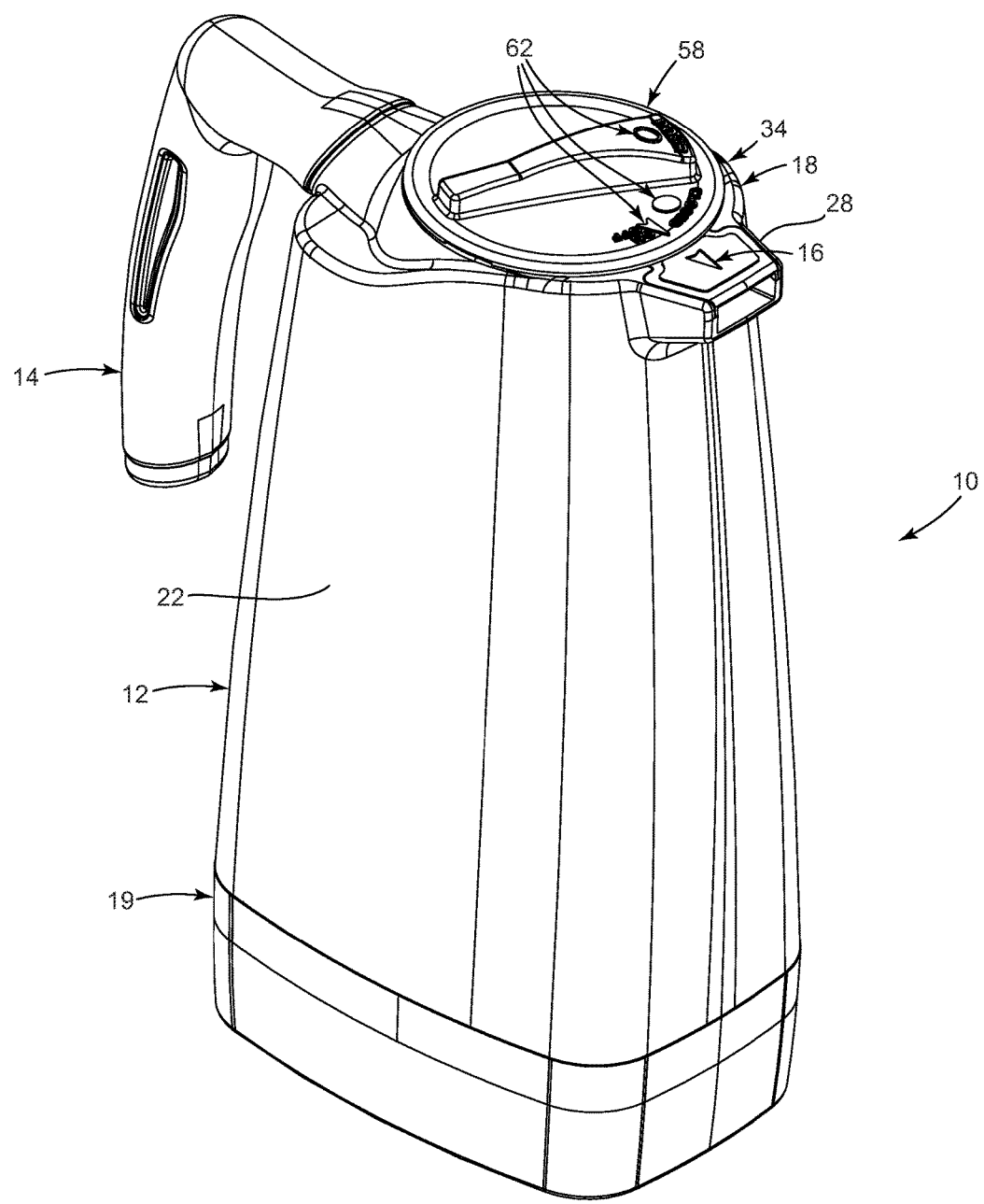
FIG. 3 is a perspective view of the beverage server shown in FIG. 1, except that the cap is shown in an "on-off" configuration in which the cap is engaged with but can be removed from the server body.

As shown in FIGS. 1-3, when the cap 58 is engaged with the cap receiving portion 34, the cap 58 can be positioned in a plurality of positions or configurations with respect to the server body 12. When the cap 58 is engaged with the cap receiving portion 34, it will be engaged within the top opening 32 and, in preferred embodiments, the cap 58 can be repositioned between these positions: a "pour" configuration, where the cap orientation indicator 62 labeled "pour" is aligned with the body orientation indicator 16, as shown in FIGS. 1 and 10A-10C; a "closed" configuration, where the cap orientation indicator 62 labeled "closed" is aligned with the body orientation indicator 16, as shown in FIGS. 2 and 9A-9C; and a "first engaged" or "on-off" configuration, where the cap orientation indicator 62 labeled "on-off" is aligned with the body orientation indicator 16, as shown in FIGS. 3 and 8A-8C. Specifically, FIG. 1 illustrates the cap 58 and the beverage server 10 in a pour configuration in which beverage or liquid beverage 4 can be dispensed from the beverage server 10 via the pour spout 28; FIG. 2 illustrates the cap 58 and the beverage server 10 in a closed configuration in which access from the chamber 30 to the pour spout 28 is blocked to prevent beverage or liquid beverage 4 from being dispensed via the pour spout 28; and FIG. 3 illustrates the cap 58 and the beverage server 10 in an on-off configuration in which the cap 58 can be removed from the top opening 32 and the server body 12. In order to engage the cap 58 within the top opening 32, the cap 58 must be generally aligned with the top opening 32 so that as the cap 58 is placed into the top opening 32, the cap 58 will assume a position in the on-off configuration as shown in FIG. 3. The user (not shown) can then grasp the cap grip 60 and rotate the cap 58 (in a clockwise direction when viewed from the top as in FIG. 8B) within the top opening 32, when the server 10 resides on a horizontal surface (not shown), such that the cap 58 is repositioned in the "closed" configuration shown in FIG. 2. When the cap 58 is positioned in the "closed" configuration, the user (not shown) can grip the cap grip 60 and rotate the cap 58 (in a clockwise direction when viewed from the top as in FIG. 9B) within the top opening 32, when the server 10 resides on a horizontal surface (not shown), such that the cap 58 is repositioned in the "pour" configuration shown in FIG. 1. The cap 58 can be repositioned from one of these three configurations to any of the other two simply by grasping the cap grip 60 and moving the cap 58 rotationally within the top opening 32 from one configuration to another.

Figure 5A:
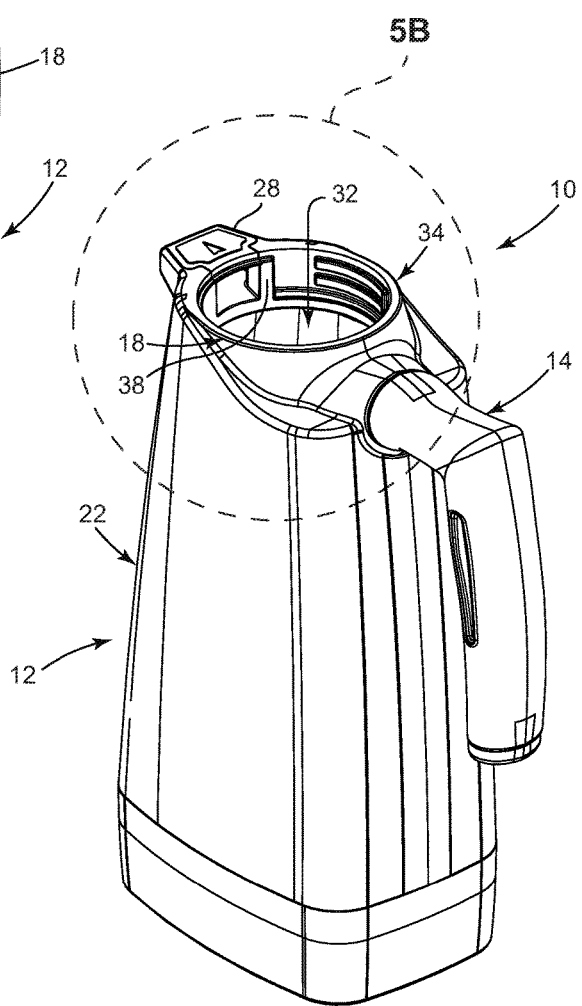
FIG. 5A is a perspective view of a portion of the beverage server of FIG. 1, but illustrating the server body with the cap removed, that is similar to the view of FIG. 4A, but the server body is oriented with the spout generally pointed away from the viewer.
Figure 5B:
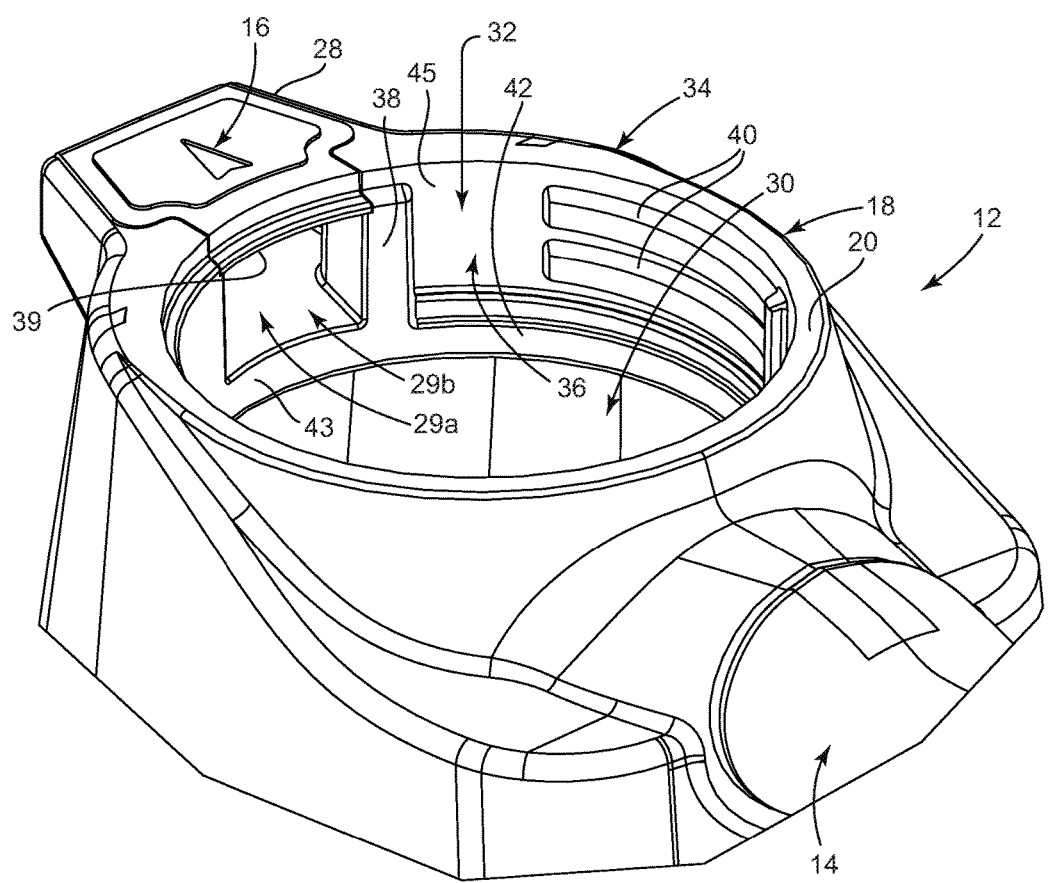
FIG. 5B is an enlarged perspective view of a portion of the server body encircled in FIG. 5A.
Figure 6A:
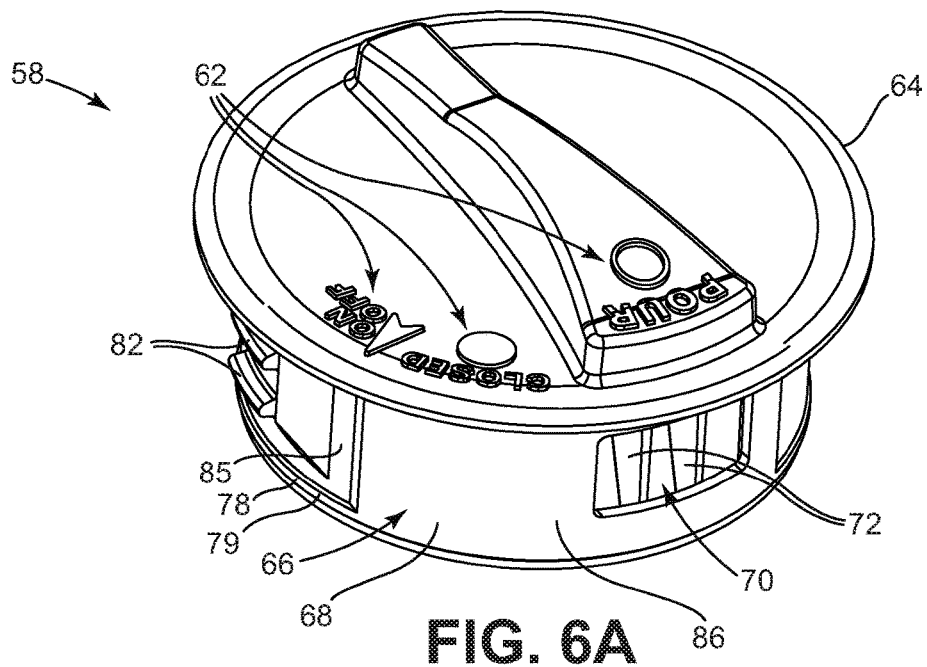
FIG. 6A is an enlarged perspective view of the cap of the preferred beverage server of FIG. 1, oriented to view the top of the cap.
Figure 6B:
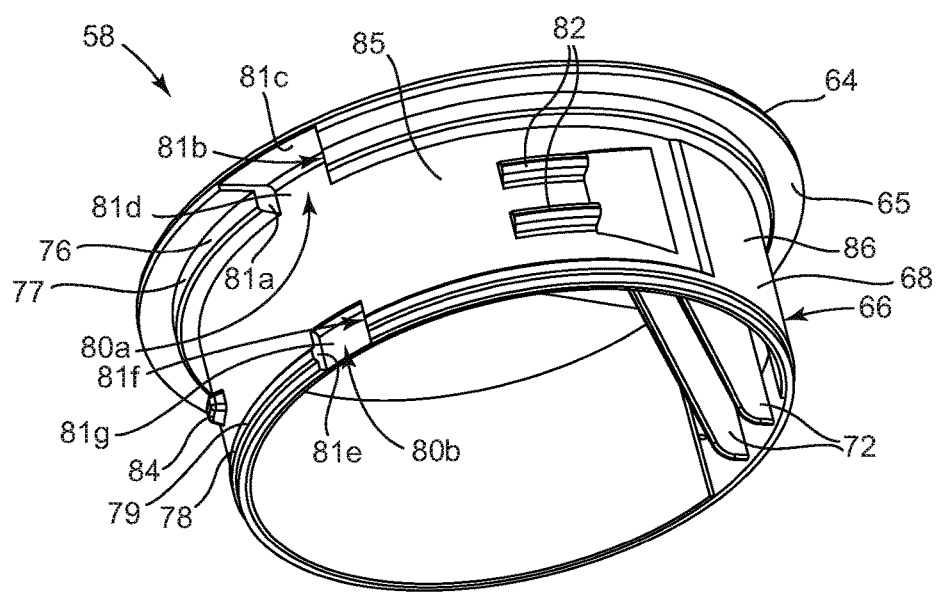
FIG. 6B is an enlarged perspective view of the cap of FIG. 6A, but oriented to view the underside of the cap.
Figure 7C:
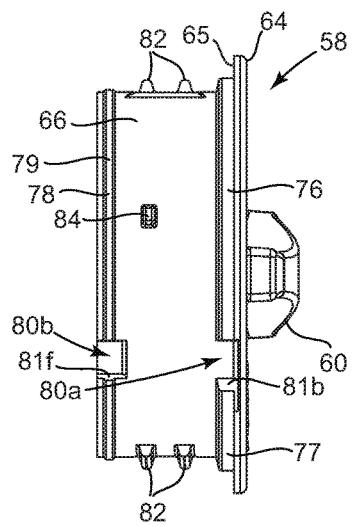
FIG. 7C illustrates the cap of FIG. 6A in a side view from the back of the cap grip 60.
Figure 7A:
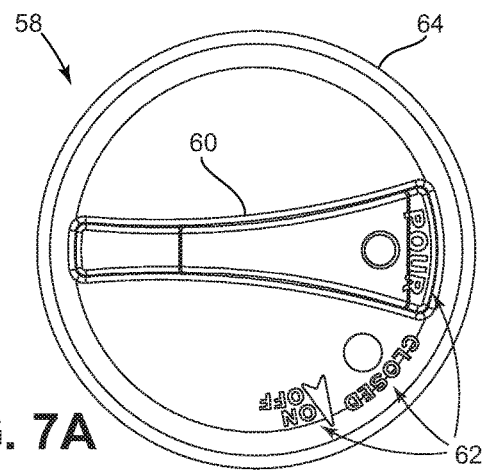
FIG. 7A illustrates the cap of FIG. 6A in a top plan view.
Figure 7B:
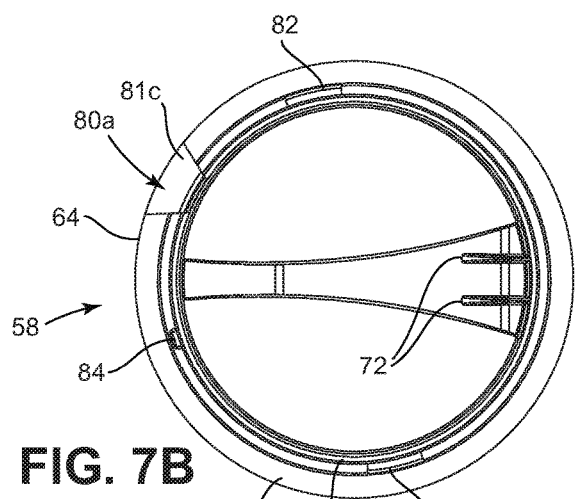
FIG. 7B illustrates the cap of FIG. 6A in a bottom plan view.
Figure 7D:
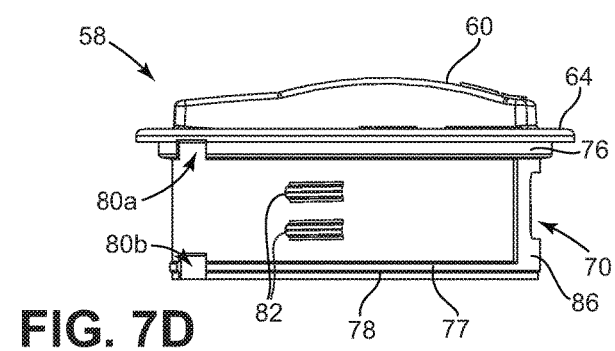
FIG. 7D illustrates the cap of FIG. 6A in a side view illustrating a side of the cap grip.

Referring now also to FIGS. 4A-7D, and initially to FIG. 6B, the cap 58 preferably includes a cap lip 64, a cap skirt 66 having an outer facing surface 68. The outer facing surface 68 includes a closing region 86 and a clearance region 85. The outer facing surface 68 in the clearance region 85 is recessed from the outer facing surface 68 in the closing region 86. The outer facing surface 68 also includes an outer surface 79 of a skirt projection 78 that is continuous with the closing region 86. The outer facing surface 68 also includes thread lugs 82 and at least one detent projection 84, both of which are located in the clearance region 85. Although the clearance region 85 is otherwise recessed with respect to the closing region 86, the thread lugs 82 and the detent projection 84 are both projected outwardly from the clearance region 85 further than the projection of the closing region 86.

As noted, the outer facing surface 68 of the cap skirt 66 includes the clearance region 85 and the closing region 86. The closing region 86 projects outwardly further than the clearance region 85, but not as far as the thread lugs 82 and the detent projection 84. As such, the clearance region 85 is recessed with respect to the closing region 86 and does not come into contact with the surfaces of the cap skirt 66 discussed below. The closing region 86, however, is constructed and arranged so that the closing region 86 will come into sufficient contact with a raised portion 38 of an inner facing portion 36 of the cap receiving portion 34 of the container 22 when the cap 58 is in either the closed configuration or the pour configuration, so that the liquid beverage 4 is effectively prevented from leaving the chamber 30 by passing between the closing region 86 of the outer facing surface 68 and the raised portion 38 of the inner facing portion 36 of the cap receiving portion 34. The cap receiving portion 34 also includes an inner surface 43 of a protruding ring 42, which is contiguous with the raised portion 38 of the inner facing portion 36. When the cap 58 is engaged with the top opening 32 in the closed and the pour configurations, an outer surface 79 of the skirt projection 78 will be in contact with the inner surface 43 of the protruding ring 42 to restrict the passage of liquid beverage 4 between these two surfaces.

The cap 58 also has a lip 64, which has an underside surface 65 that will be engaged with the top rim or top rim surface 20 of the container 22 when the cap 58 is engaged with the container 22 in the closed and the pour configurations. The cap 58 preferably has a lip projection recess 80a where the underside surface 65 of the lip 64 and the lip projection 76 are each cut away to create the recess 80a in both the underside surface 65, the lip projection 76 and the lip projection surface 77. Similarly, a skirt projection recess 80b in the clearance region 85 of the outer surface 79 of the skirt projection 78 is shown in FIG. 6B, where the outer surface 79 of the skirt projection 78 and a portion of the clearance region 85 is cut away to create the skirt recess 80b.

Figure 15:
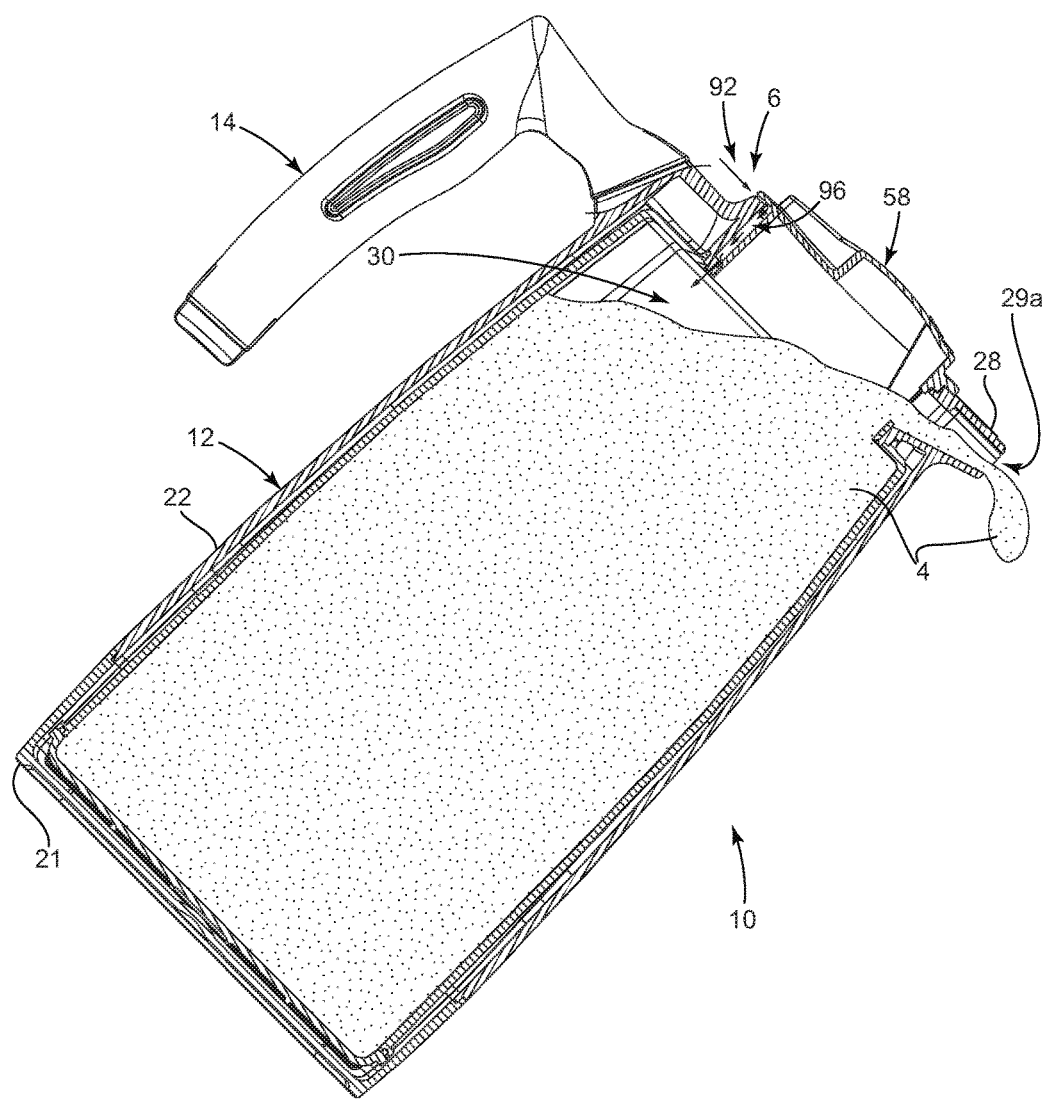
FIG. 15 is a sectioned side view of the beverage server of FIG. 10A, sectioned along the bent section line 10C-10C as indicated on FIG. 10B, showing the cap in the pour configuration and showing the beverage server tilted to dispense beverage, illustrated with beverage being dispensed via the pour spout and air being drawn in to the chamber via the air vent.

Each of these recesses 80a and 80b cooperate with the respective surfaces of the top opening 32 to define an air passage way or air vent 90 through which air 6 can pass into the chamber 30 when the cap 38 is engaged within the container 22 in the pour configuration and liquid beverage 4 is being poured out of the chamber 30 as shown in FIG. 15.

Figure 4A:
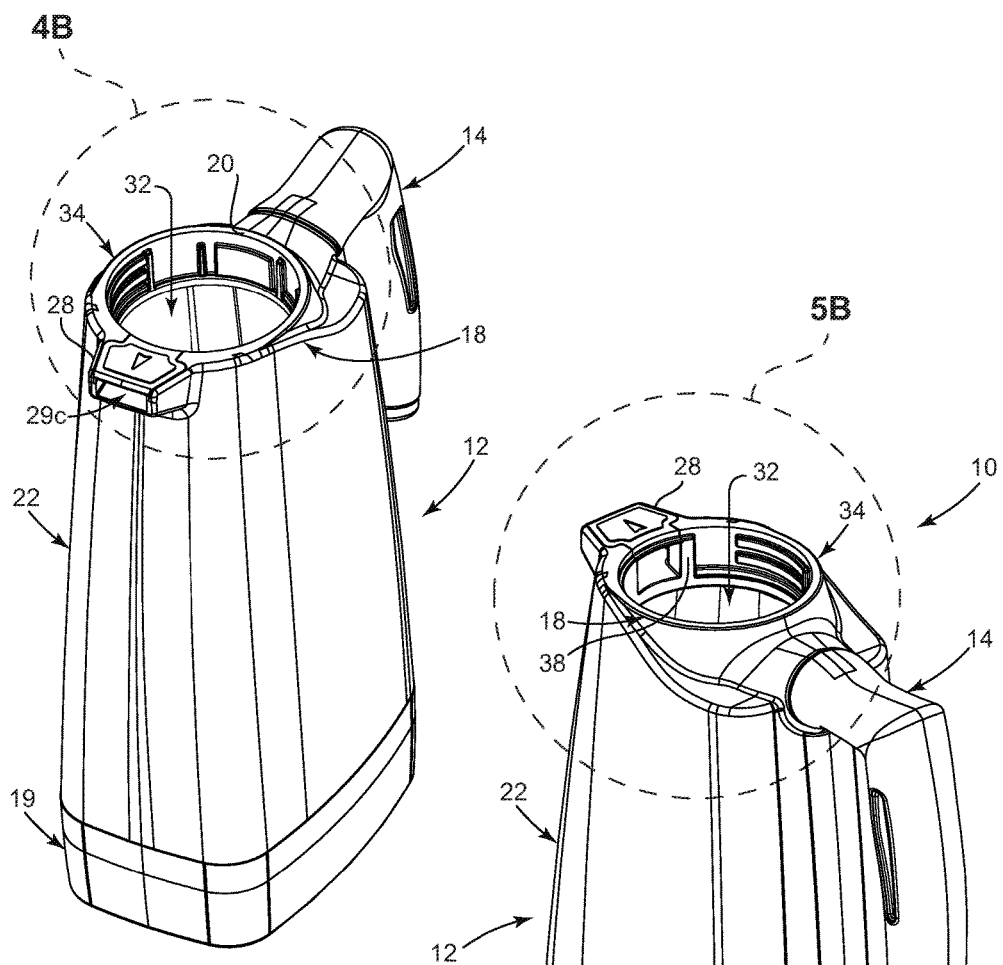
FIG. 4A is a perspective view of portion of the beverage server of FIG. 1, but illustrating the server body with the cap removed, oriented with the spout pointed generally in the direction of the viewer.
Figure 4B:
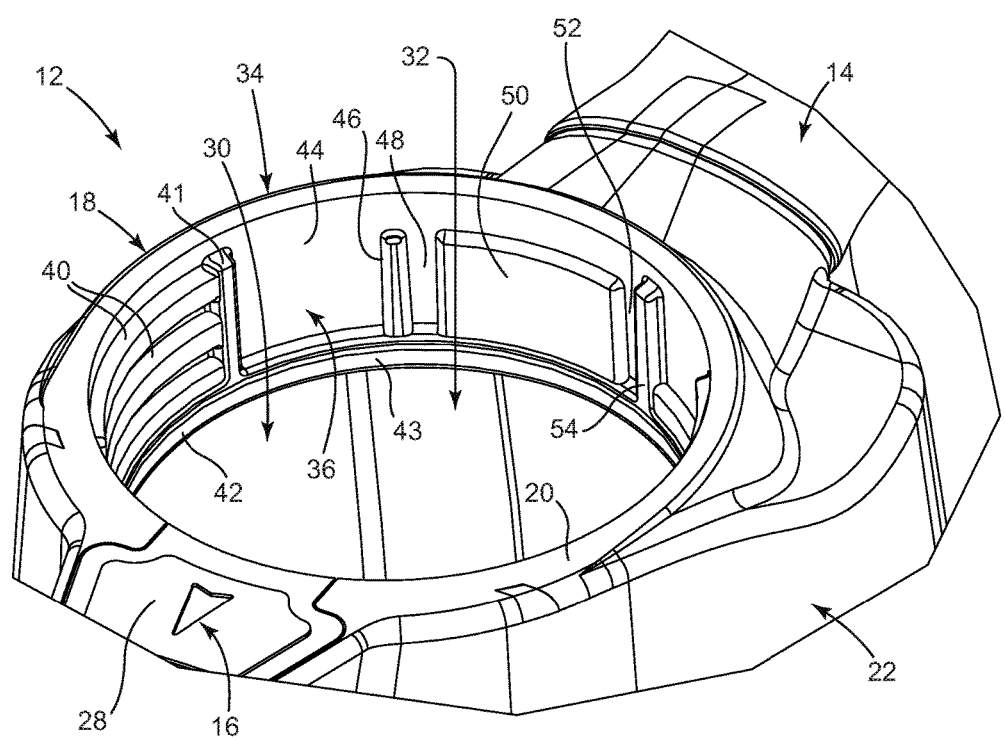
FIG. 4B is an enlarged perspective view of the portion of the server body encircled in FIG. 4A, to show elements in further detail including a chamber.

The server body 12 is shown in further detail in FIGS. 4A-5B. FIG. 4A illustrates the server body 12 with the spout 28 generally oriented toward the viewer, and viewed from somewhat above and somewhat to the side of the server body 12. FIG. 5A illustrates the server body 12 with the spout 28 generally oriented away from the viewer, and viewed from somewhat above and somewhat to the side of the server body 12.

FIGS. 4B and 5B are enlarged views of the top portion 18 of the container 22 as indicated on FIGS. 4A and 5A, respectively, to show enlarged detail. The cap receiving portion 34 is illustrated, generally located proximate the top portion 18 of the server body 12. The top opening 32 provides access to the chamber 30, and various structures and features relating to the engagement with the cap 58 are shown. The server body 12 preferably has a top rim 20, which extends around the top opening 32. The cap receiving portion 34 preferably includes an inner facing portion 36 constructed and arranged to engage the cap 58. The cap receiving portion 34 preferably includes opposing sets of threads 40 which protrude outwardly from opposing sides of the inner facing portion 36 in order to engage the thread lugs 82 when the cap 58 is engaged within the top opening 32 and oriented in either the pour configuration or the closed configuration or any position between these configurations. The threads 40 preferably have a slight pitch, so that the cap 58 is slightly tightened with respect to the server body 12 as the thread lugs 82 are moved along the threads 40 from the on-off configuration toward the closed configuration. Preferably, the cap lip 64, and particularly the lip underside surface 65, as further described below with regard to the cap 58, is held in close proximity to the top rim 20 by engagement of the thread lugs 82 with the threads 40 when the server 10 is in the closed configuration and the pour configuration. The lip underside surface 65 of the lip 64 is also held in close proximity to the top rim 20 by engagement of the thread lugs 82 with the threads 40 when the server 10 is moved from the closed configuration to the pour configuration and vice versa. A lug stop 41 is preferably in position to limit travel of the thread lugs 82, so that when the cap 58 is moved from the closed configuration to the pour configuration and the thread lugs 82 advance correspondingly along the threads 40, the thread lugs 82 are prevented from advancing past the position they occupy in the pour configuration.

Referring further to FIG. 5B, the top portion 18 of the container 22 includes a pour spout 28. The pour spout 28 defines a spout passageway 29a, which has both an internal opening 29b and an external opening 29c (see FIGS. 4A-5B) through which a liquid beverage 4 will flow when a beverage is poured out of the chamber 30 as shown in FIG. 15. The cap receiving portion 34 preferably includes a raised closing surface 38, including an upper internal opening frame 39, which allows the raised closing surface 38 to surround the internal opening 29b. The raised closing surface 38 also includes an inner surface 43 of a protruding ring 42, which encircles the top opening 32. For that reason, when the cap 58 is engaged within the top opening 32, the outer surface 79 of the skirt projection 78 and the outer facing surface 68 in the closing region 86 will be engaged with the raised closing surface 38 of the preferred cap 58, such that neither air (not shown) nor liquid beverage 4 from the chamber 30 of the container 22 will pass out of the chamber 30 under ambient temperature and pressure, preferably normal temperature and pressure (NTP), between these respective surfaces.

The cap receiving portion 34 of the preferred container 22 includes an on-off detent 44 space (see FIG. 4B) within which the detent projection 84 passes as the preferred cap 58 is placed onto the server body 12 to engage the server body 12 and as the cap 58 is removed from the server body 12, as described further below. From the on-off configuration, as the cap 58 is rotated with respect to the server body 12 towards the closed configuration, the detent projection 84 preferably contacts a passing stop 46 which resists but does not prevent further rotation of the cap 58. The cap 58 can be rotated further, in spite of the contact between the detent projection 84 and the passing stop 46 until the detent projection 84 is moved past the passing stop 46 to a closed detent or closed detent space 48. When the detent projection 84 is located with the closed detent space 48, the server 12 is in the closed configuration. The cap receiving portion 34 preferably has a passing region 50 which offers limited resistance to further rotation of the cap 58. The cap 58 can be rotated further, with the contact between the detent projection 84 and the passing region 50 offering limited resistance to such further rotation until the detent projection 84 is moved past the passing region 50 to a pour detent or pour detent space 52 positioned adjacent to a detent stop 54. When the detent projection 84 is located proximate the pour detent 52, the server 12 is in the pour configuration. The cap receiving portion 34 has a detent stop 54 adjacent to the pour detent space 52 that will prevent the detent projection 84 from rotating further, past the pour configuration. In this way the detent projection 84 interacts with the on-off detent 44, the passing stop 46, the closed detent 48, the passing region 50, the pour detent 52, and the detent stop 54 to allow the server 10 to be in the on-off configuration, the closed configuration, and the pour configuration as desired, while providing tactile feedback to aid the user (not shown) in positioning the cap 58 with respect to the server body 12.

In preferred embodiments, the cap receiving portion 34 includes a lug freeway 45 in which the thread lugs 82 of the cap 58 pass as the cap 58 is placed into the cap receiving portion 34 when the cap 58 is engaged with the server body 12 in the on-off configuration, as further described below. It will be appreciated that there are thread lugs 82 on opposite sides of the cap 58 and that these thread lugs 82 are received within the lug freeways 45 opposite each other on the inner facing portion 36 of the cap receiving portion 34. Each of the lug freeways 45 are adjacent to threads 40. When the cap 58 is inserted into and engaged within the cap receiving portion 34, and the cap 58 resides in the on-off configuration, the thread lugs 82 are unengaged. When the cap 58 is rotated clockwise from the on-off configuration to either the closed configuration or the pour configuration, the thread lugs 82 will become engaged beneath the respective threads 40 at the respective sides of the inner facing portion 36 of the cap receiving portion 34. When the cap 58 is in these two configurations (the closed configuration and the pour configuration), the threads 40 on the respective sides of the cap 58 will prevent the cap 58 from being removed from the top opening 32 and disengaging from the server body 12.

The container 22 at least partially defines the chamber 30. In the preferred embodiment shown in the drawing figures, the container 22 includes an inner wall or liner 24, and an outer wall or shell 26 (see FIG. 8C and others). There is a separation space 27 between the liner 24 and the shell 26 as illustrated (FIG. 8C). In this embodiment, there is at least one server body orientation indicator 16 for orienting the cap 58 with respect to the server body 12, such as to a position of the cap 58 in relationship with the pour spout 28.

Referring now to FIGS. 4A-5B and 6A-7D, the cap 58 includes a cap lip 64, and a cap skirt 66 having an outer facing surface 68, which includes thread lugs 82 and at least one detent projection 84. The outer facing surface 68 includes structures such as these, which are generally oriented outwardly with respect to the cap skirt 66, and generally oriented toward the inner facing portion 36 of the cap receiving portion 34 when the cap 58 is engaged within the cap receiving portion 34. The outer facing surface 68 preferably includes a closing region 86 adjacent to and surrounding a fluid port 70. When the cap 58 is engaged within the cap receiving portion 34, and the server 10 and the cap 58 are in the pour configuration, the raised closing surface 38, which surrounds and extends adjacent to the internal opening 29*b*, contacts the closing region 86 of the outer facing portion 68 in order to minimize or prevent leakage of liquid beverage 4, under normal temperature and pressure (NTP) between the cap 58 and the cap receiving portion 34 when beverage or liquid beverage 4 is dispensed via the spout passageway 29*a*. When the cap 58 is engaged within the cap receiving portion 34, and the server 10 and the cap 58 are in the closed configuration, the raised closing surface 38, which surrounds and extends adjacent to the internal opening 29*b*, contacts the closing region 86 of the outer facing portion 68 in order to minimize or prevent leakage of liquid beverage 4 from the fluid port 70 and between the cap 58 and the cap receiving portion 34 if the server 10 were to be tipped or jostled when in the closed configuration. Also, when the cap 58 is engaged within the cap receiving portion 34, and the server 10 and the cap 58 are in the closed configuration, a portion of the closing region 86 of the outer facing surface 68 will be positioned directly in line with the entire internal opening 29*b* in the cap receiving portion 34 so that any potential liquid beverage 4 that might otherwise flow from the chamber 30 into the spout passageway 29*a* will be blocked by the portion of the cap skirt 66 positioned in line with the internal opening 29*b*. The cap 58 will preferably include the fluid port 70 which allows liquid beverage 4 to pass into the passageway 29*a* when the beverage server 10 is in the pour configuration and the fluid port 70 is in line with the passageway 29*a*. The cap 58 preferably includes fluid port supports 72 that provide structural support proximate the cap skirt 66 adjacent to the fluid port 70. The fluid port supports 72 can limit passage through the pour spout 28, by blocking the passage of pieces of ice (not shown) which are too large to pass between the respective fluid port supports 72 and through the pour spout 28, but allowing smaller pieces of ice and liquid beverage 4 to pass through the fluid port 72 and into the pour spout 28, when the server 10 is utilized for iced beverage 4. The cap 58 includes a cap grip 60 which can aid in positioning of the cap 58 when the cap 58 is engaged with the cap receiving portion 34. The cap 58 includes cap orientation indicator(s) 62 for orienting the cap 58 with respect to the server body 12 and the server body orientation indicator 16, so as to position the cap 58 in a desired relationship with the spout 28. The cap orientation indicators 62 can include words, letters, symbols, or combinations, such as those illustrated herein. Further, the cap orientation indicator(s) 62 can include the cap grip 60, which in the examples illustrated herein, has a generally elongated shape that can be used as an orientation indicator to aid in alignment of the cap 58 with the spout 28.

As further described below, and referring especially to FIG. 6B, the cap 58 includes a lip projection 76 having a lip projection outer surface 77 located proximate the cap lip 64. The outer surface 77 at the lip projection 76 is contiguous with a lip underside surface 65. The cap 58 preferably includes a venting cutout or lip projection recess 80*a* in the lip projection 76 and in the cap lip 64, such that there is a recess in the underside surface 65 of the cap lip 64 and in the outer surface 77 of the lip projection 76. The lip projection 76 and the outer surface 77 continue around the generally round cap 58, except where each is interrupted by the lip projection recess 80*a*, where the lip projection 76 is discontinuous, due to the presence of the lip projection recess 80*a*. Similarly, the underside surface 65 of the lip 64 is discontinuous where the lip projection recess 80*a* creates a recess in the underside surface 65. The lip projection recess 80*a* is defined in part by recess surface 81*a* and recess surface 81*b*, where the lip projection 76 is cut away at a generally 90 degree angle with respect to both the cap skirt 66 and the underside 65 of the cap lip 64, and recess surface 81*c* in the underside 65 of the cap lip 64, and recess surface 81*d* that results from cutting away from the lip projection 76 and the underside surface 65 of the cap lip 64. The cap lip 64 continues around the generally round cap 58, as does the underside surface 65 of the cap lip 64, except where the underside surface 65 is recessed at the lip projection recess 80*a*. As such, the lip underside surface 65 continues around the generally round cap 58 as a planar surface, except where it is interrupted by the lip projection recess 80*a* and the lip underside surface 65 is discontinuous due to the presence of the lip projection recess 80*a*. When the cap 58 is engaged within the server body 12 in either the closed or the pour configuration, the underside surface 65 of the cap lip 64 will be drawn against the top rim 20, when the thread lugs 82 are engaged with the threads 40, so that the passage of air between the underside surface 65 and the top rim 20 will be minimized or prevented under normal temperature and pressure (NTP). At the same time, however, the lip projection recess 80*a* will extend into the lip underside surface 65, and into the lip projection 76, to allow air to pass between the top rim 20 and the recess surface 81*c* when the beverage server 10 is in the pour configuration, as described further below. The outer surface 77 of the lip projection 76 will also engage the inner facing portion 36 of the cap receiving portion 34 when the cap 58 is engaged within the server body 12 in either the closed or the pour configurations, so as to restrict the flow of air, but the separation between the inner facing portion 36 and the recess surface 81*d* will allow air to pass.

The cap 58 also includes a skirt projection 78 having a skirt projection outer surface 79 that extends outwardly beyond the clearance region 85 of the outer facing surface 68 in portions of the skirt 66 where the skirt projection 78 is adjacent to the clearance region 85. The outer surface 79 of the skirt projection 78 is contiguous with and a part of the closing region 86 of outer facing surface 68. The cap 58 also includes a venting cutout or skirt projection recess 80*b* in both the skirt projection 78 and the cap skirt 66 proximate the clearance region that preferably lines up with the lip projection 76 so as to cooperate with the inner facing portion 36 of the cap receiving portion 34 to define in part an air vent 92 and a vent passageway 96 to allow air 6 to pass into the chamber 30 from outside of the server 10 when the cap 58 and the server 10 are in the pour configuration. The skirt projection 78 preferably continues around the generally round cap 58, except where it is interrupted by the skirt projection recess 80*b*, where the skirt projection 78 is discontinuous due to the presence of the skirt projection recess 80b. The skirt projection recess 80b is defined in part by a recess surface 81e and a recess surface 81f, which create an end to the skirt projection 78 and also create a recess in the outer facing surface 68 proximate the skirt projection recess 80b and recess surface 81g. The skirt projection recess 80b extends into the skirt projection 78 and the outer facing surface 68 so as to cooperate with the inner facing portion 36 of the cap receiving portion 34 to define in part the air vent 92 and the vent passageway 96 to allow air 6 to pass into the chamber 30 from outside of the server 10 when the cap 58 and the server 10 are in the pour configuration.

Figure 8A:
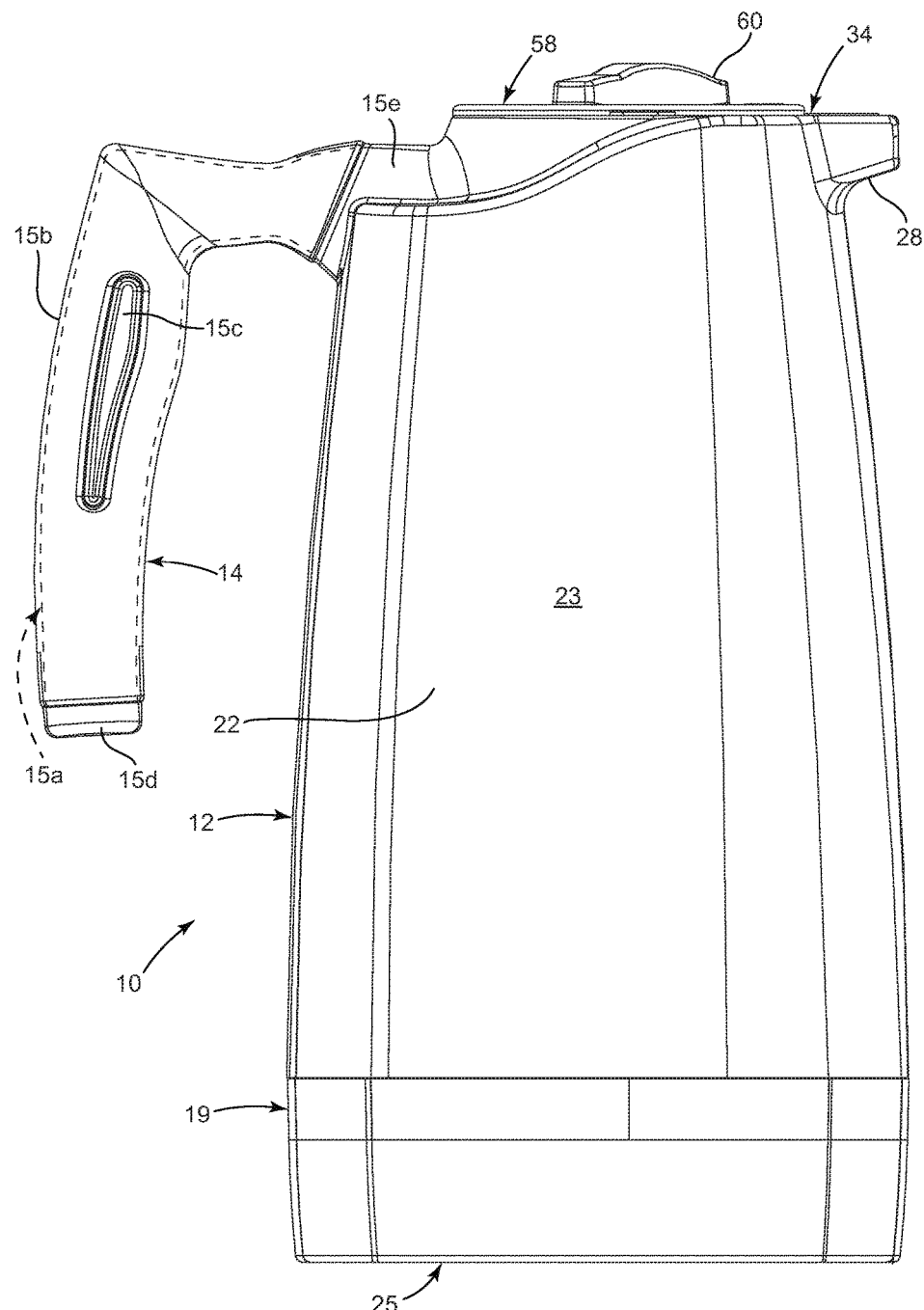
FIG. 8A is a side view of the beverage server of FIG. 1, showing the cap in the on-off configuration.
Figure 8B:
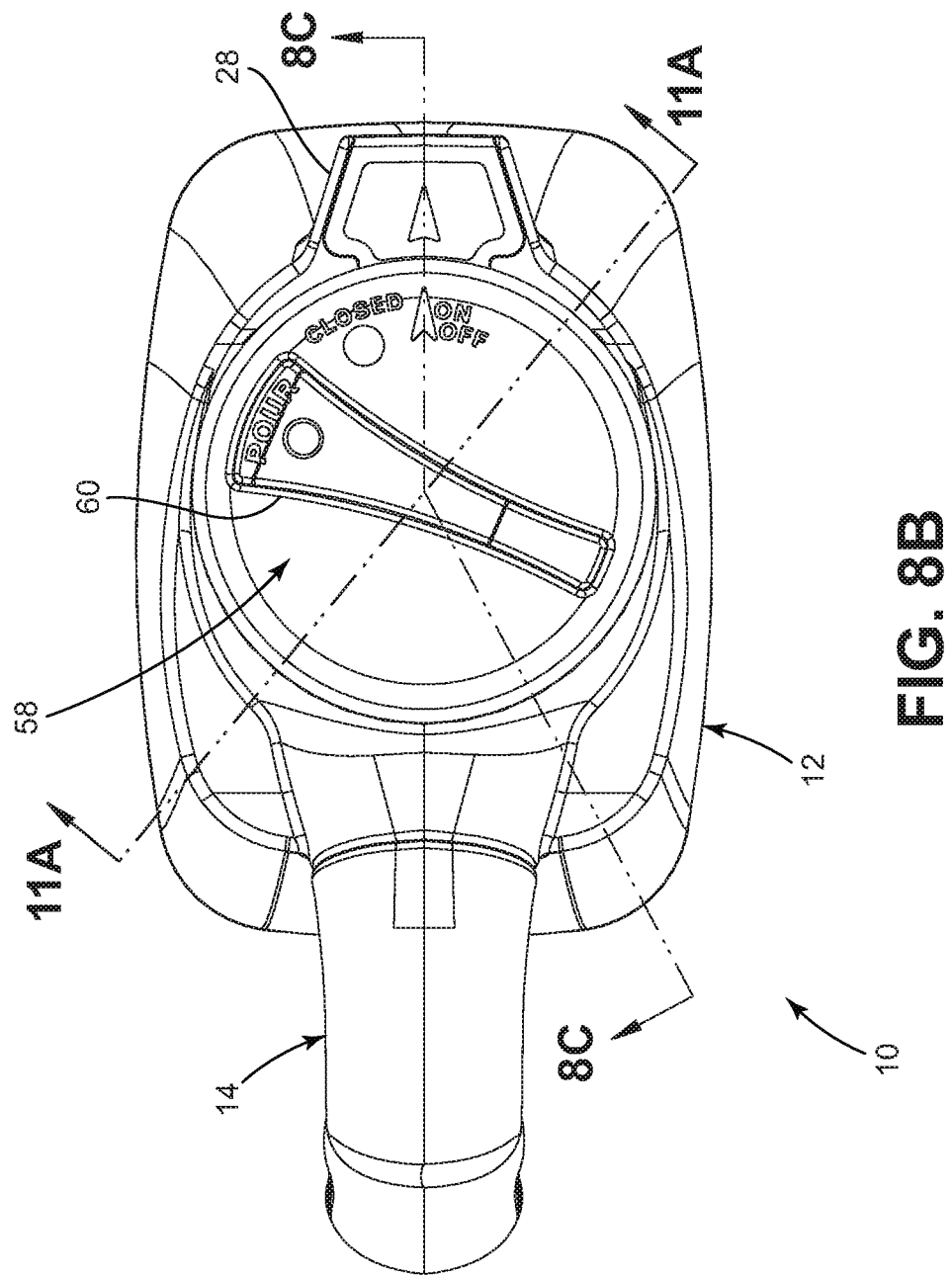
FIG. 8B is a top view of the beverage server of FIG. 8A, showing the cap in the on-off configuration as shown in FIG. 8A.
Figure 8C:
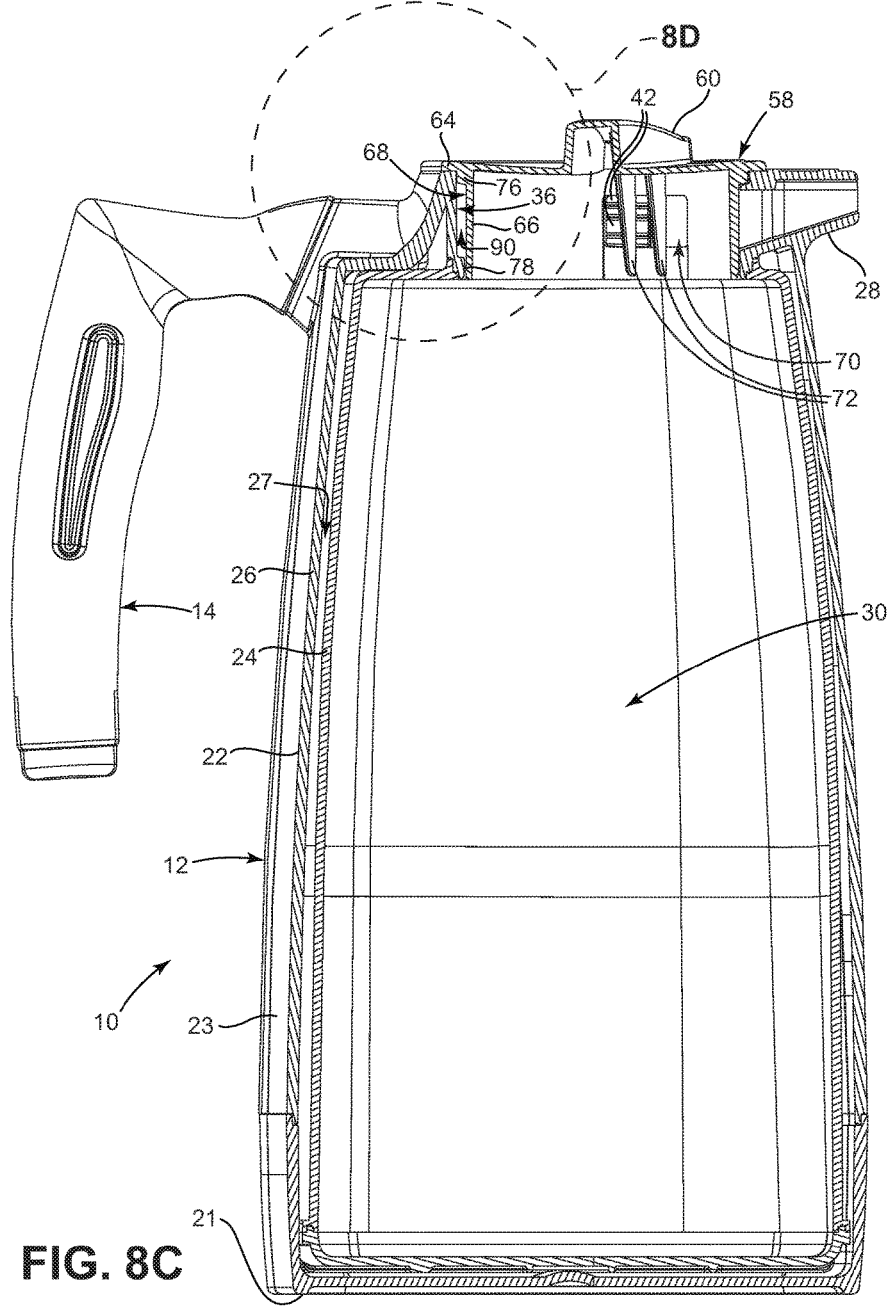
FIG. 8C is a cross-section or section view of the beverage server of FIG. 8A, showing the cap in the on-off configuration, sectioned along the bent section line 8C-8C as indicated on FIG. 8B.
Figure 9A:
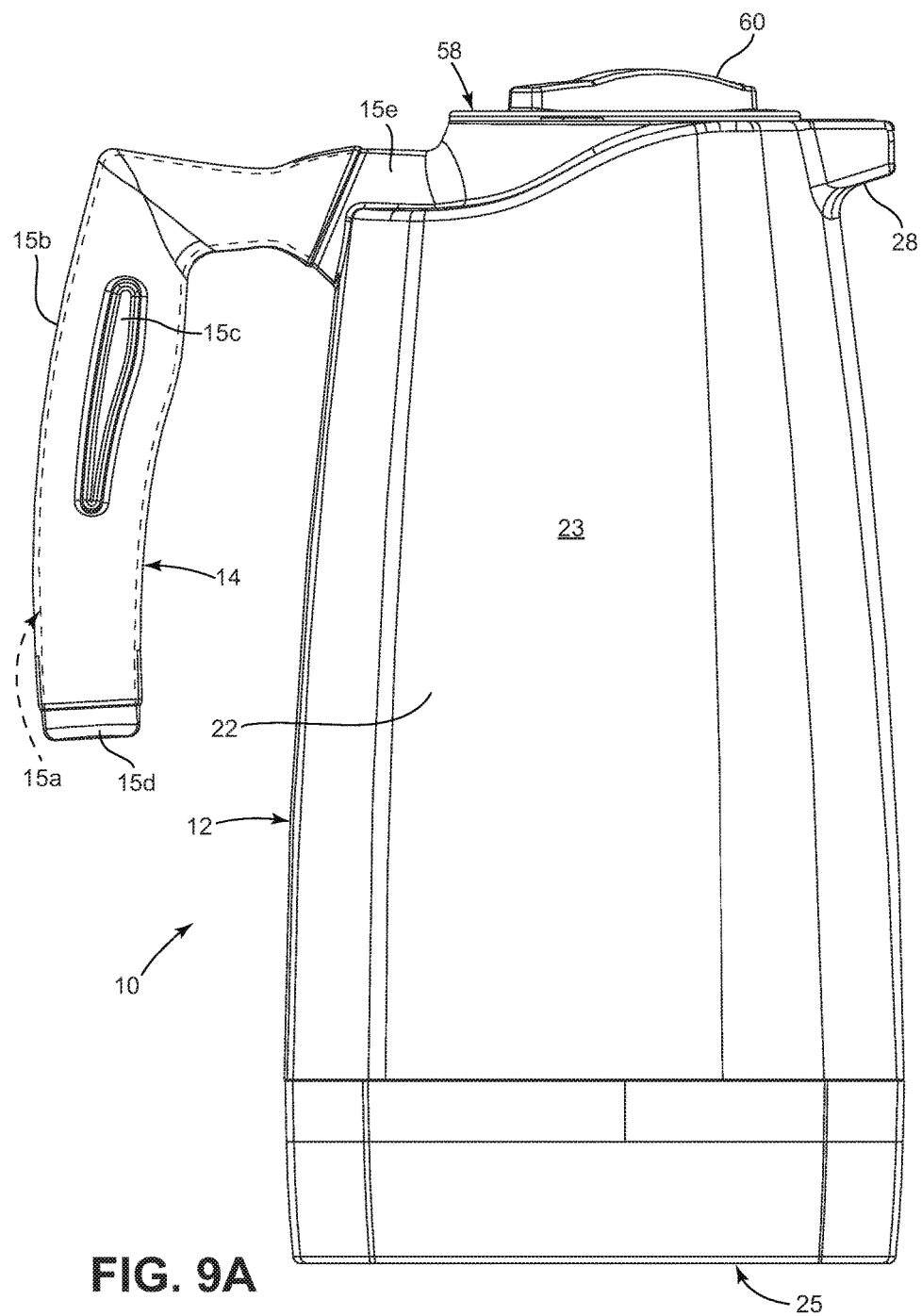
FIG. 9A is a side view of the beverage server of FIG. 1, showing the cap in the closed configuration.
Figure 9B:
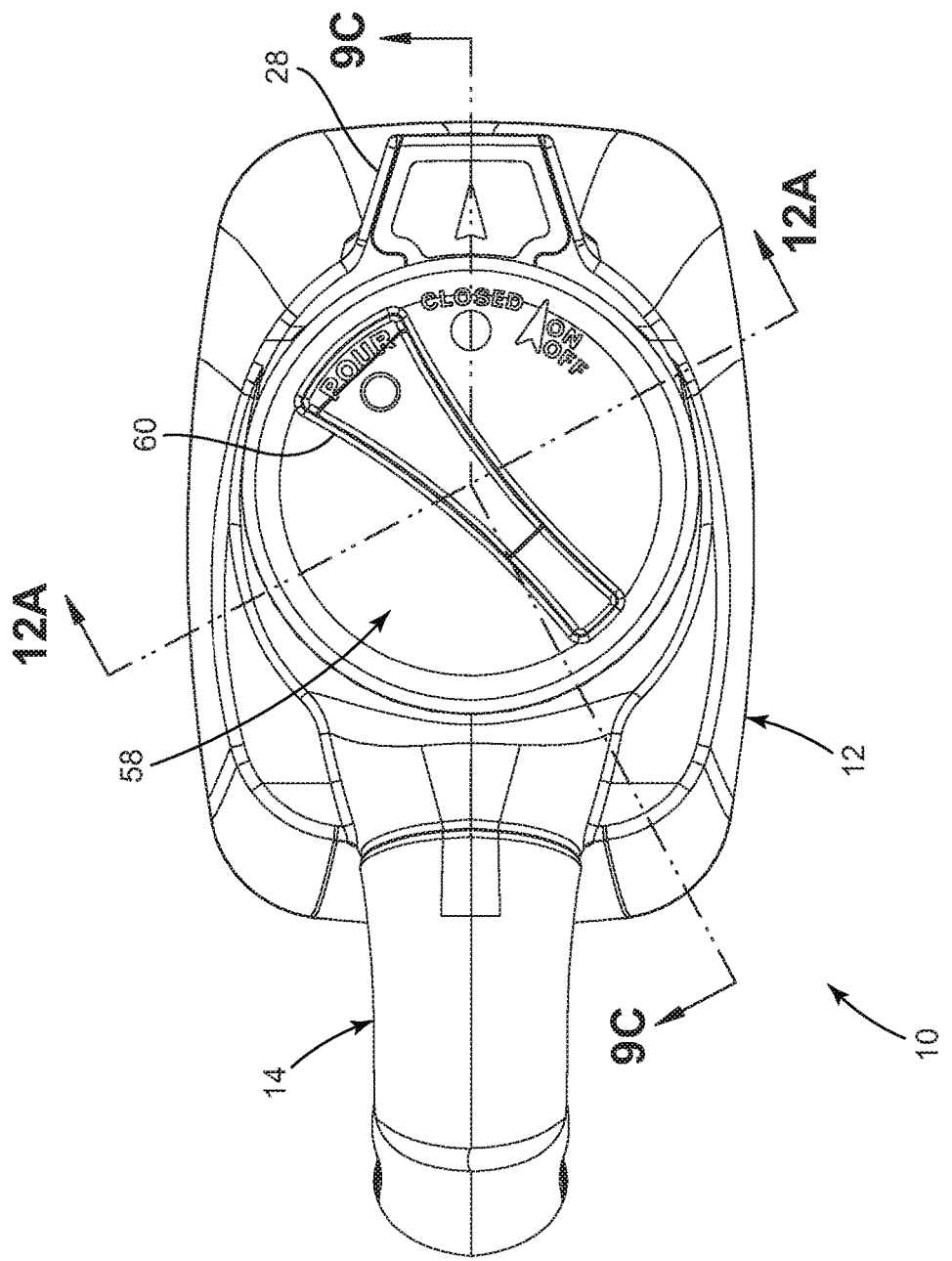
FIG. 9B is a top view of the beverage server of FIG. 9A, showing the cap in the closed configuration as shown in FIG. 9A.
Figure 9C:
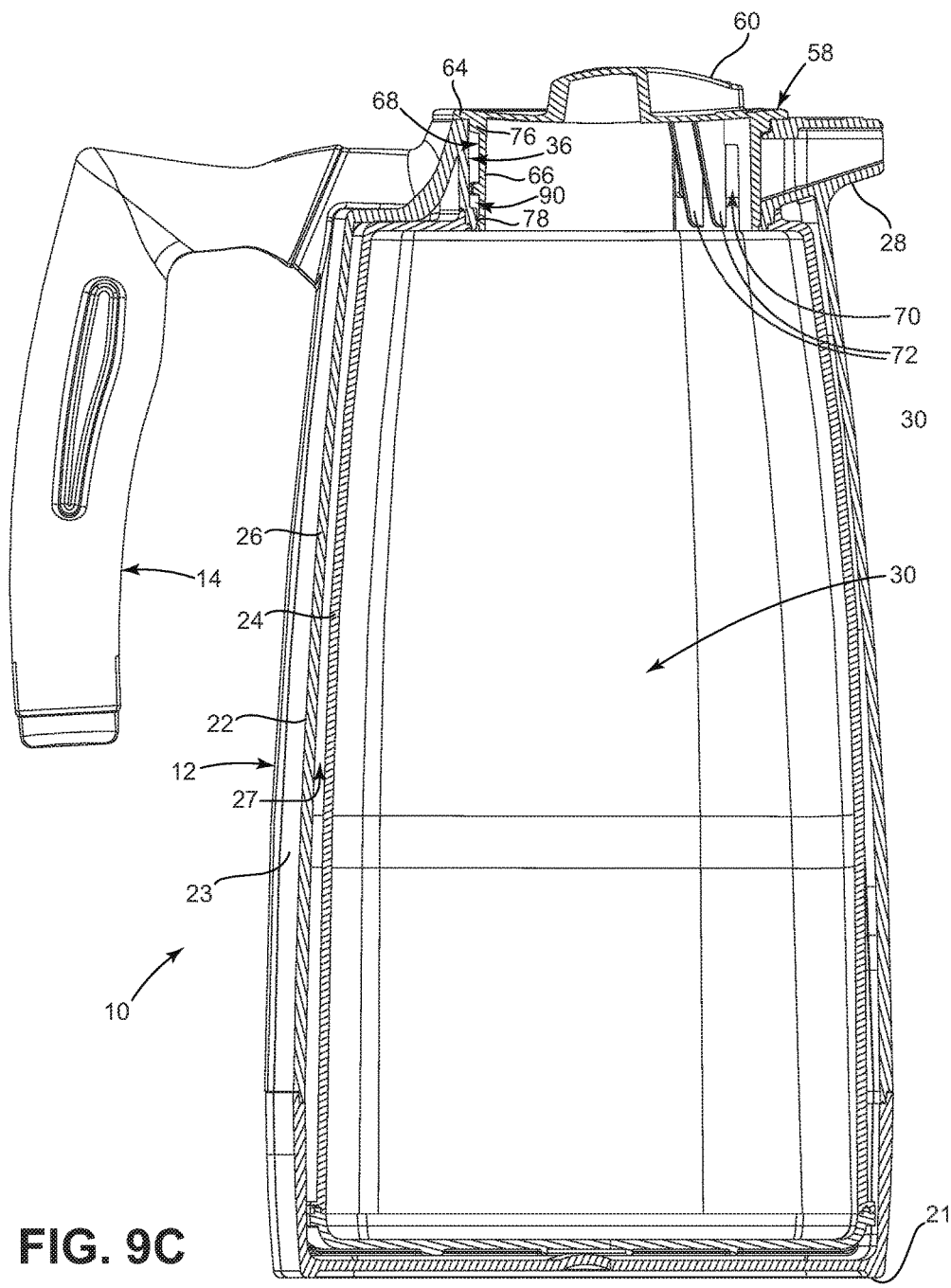
FIG. 9C is a section view of the beverage server of FIG. 9A, showing the cap in the closed configuration, sectioned along the bent section line 9C-9C as indicated in FIG. 9B.
Figure 10A:
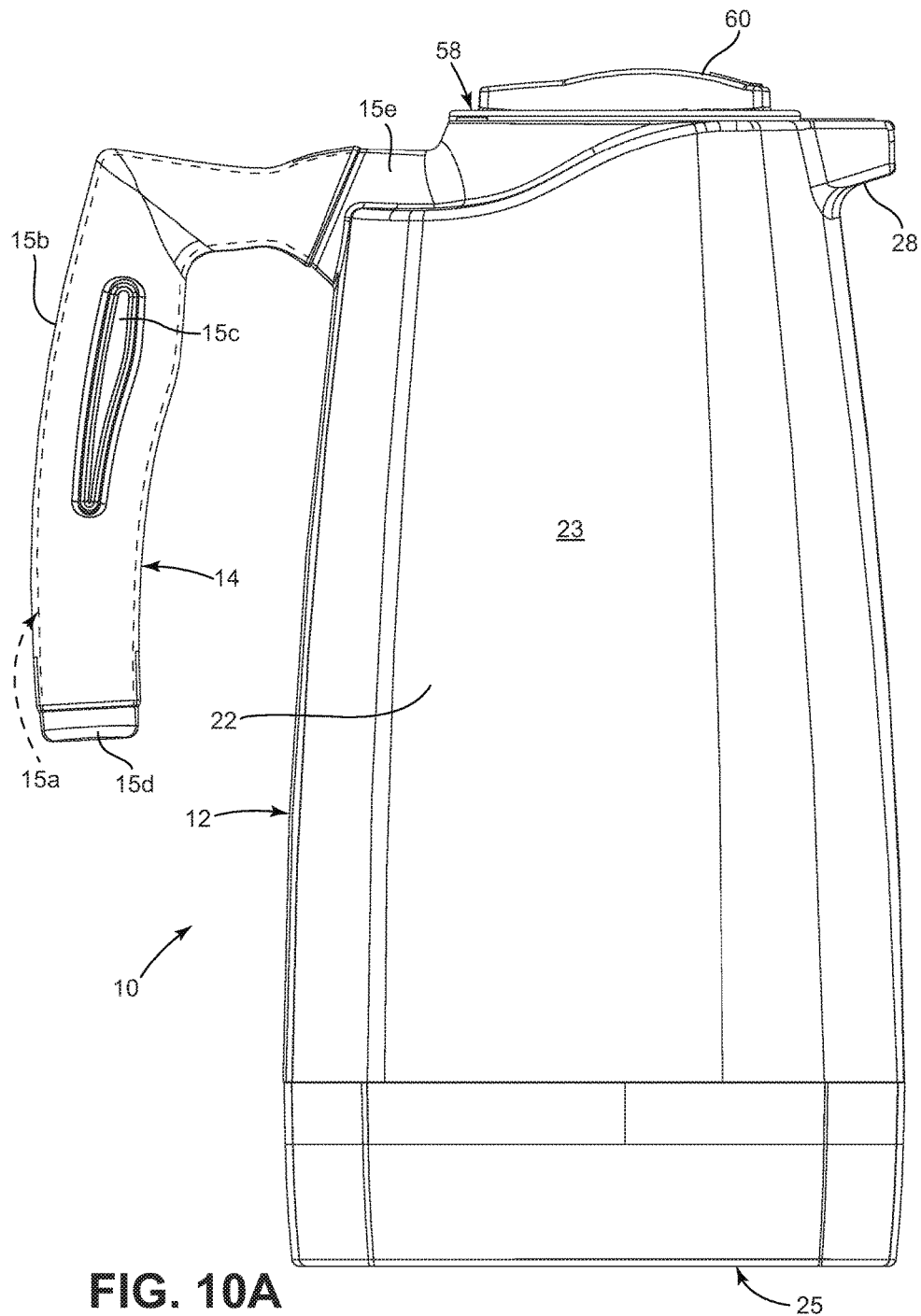
FIG. 10A is a side view of the beverage server of FIG. 1, showing the cap in the pour configuration.
Figure 10B:
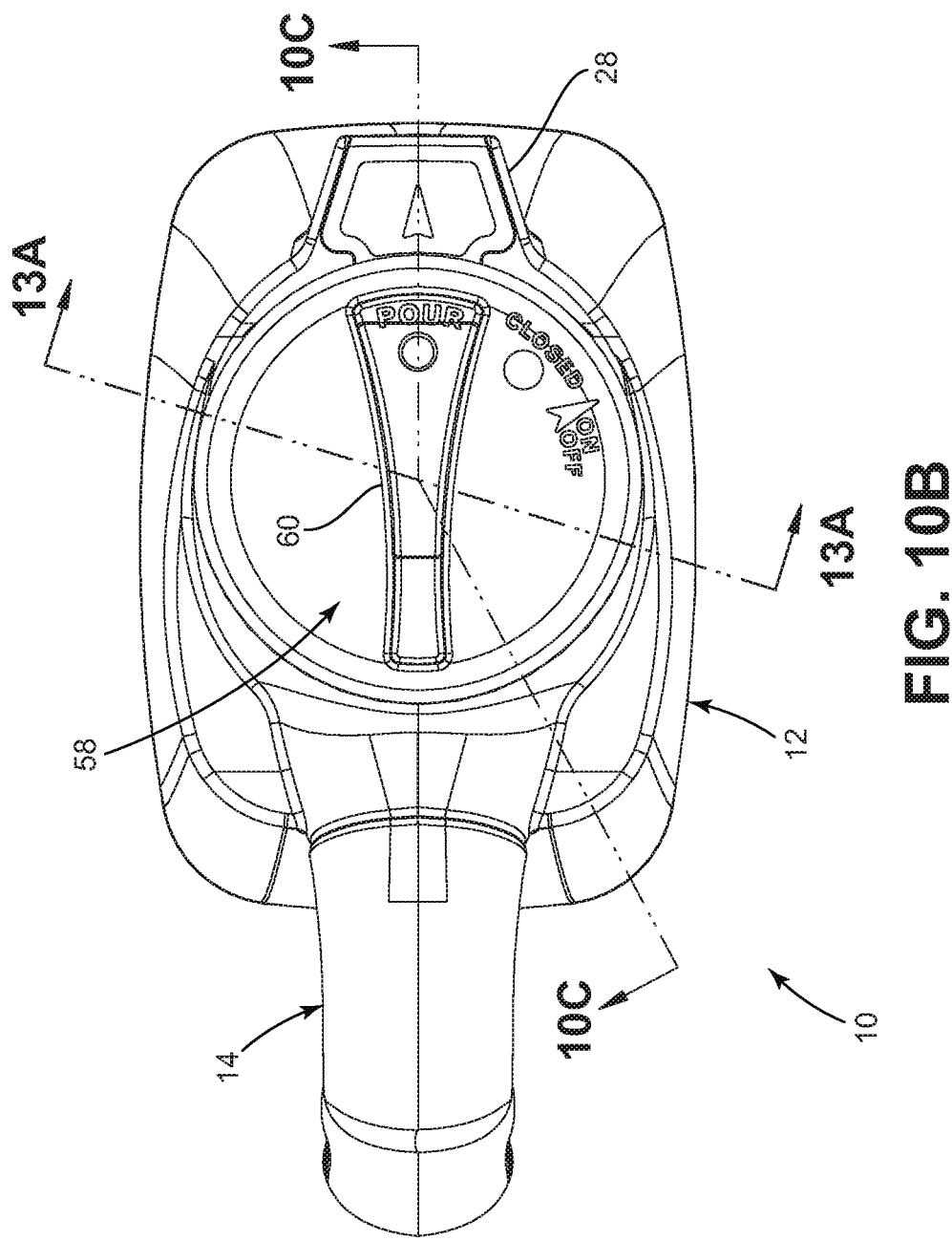
FIG. 10B is a top view of the beverage server of FIG. 10A, showing the cap in the pour configuration.

FIGS. 8A-8C, 9A-9C, and 10A-10C are similar sets of views illustrating the beverage server 10 in the on-off, the closed, and the pour configurations, respectively. FIG. 8A and FIG. 8B show a side elevation view and a top plan view, respectively, of the beverage server 10, in the on-off configuration. Similarly, FIG. 9A and FIG. 9B show a side elevation view and a top plan view, respectively, of the beverage server 10, in the closed configuration. Similarly, FIG. 10A and FIG. 10B show a side elevation view and a top plan view, respectively, of the beverage server 10, in the pour configuration.

Referring now also to FIGS. 8A, 9A, and 10A, the server body 12 includes a handle 14 having a handle neck 15e and a handle core 15a (shown only in phantom) that is covered by a polymeric sleeve or handle sleeve 15b. The handle core 15a is preferably contiguous with the handle neck 15e and the server body 12. The handle 14 preferably extends to a handle tip 15d, and preferably includes handle recesses 15c. The handle core 15a is preferably covered by a handle sleeve 15b, which provides a grip for use during handling of the beverage server 10 and during dispensing of liquid beverage 4.

Figure 10C:
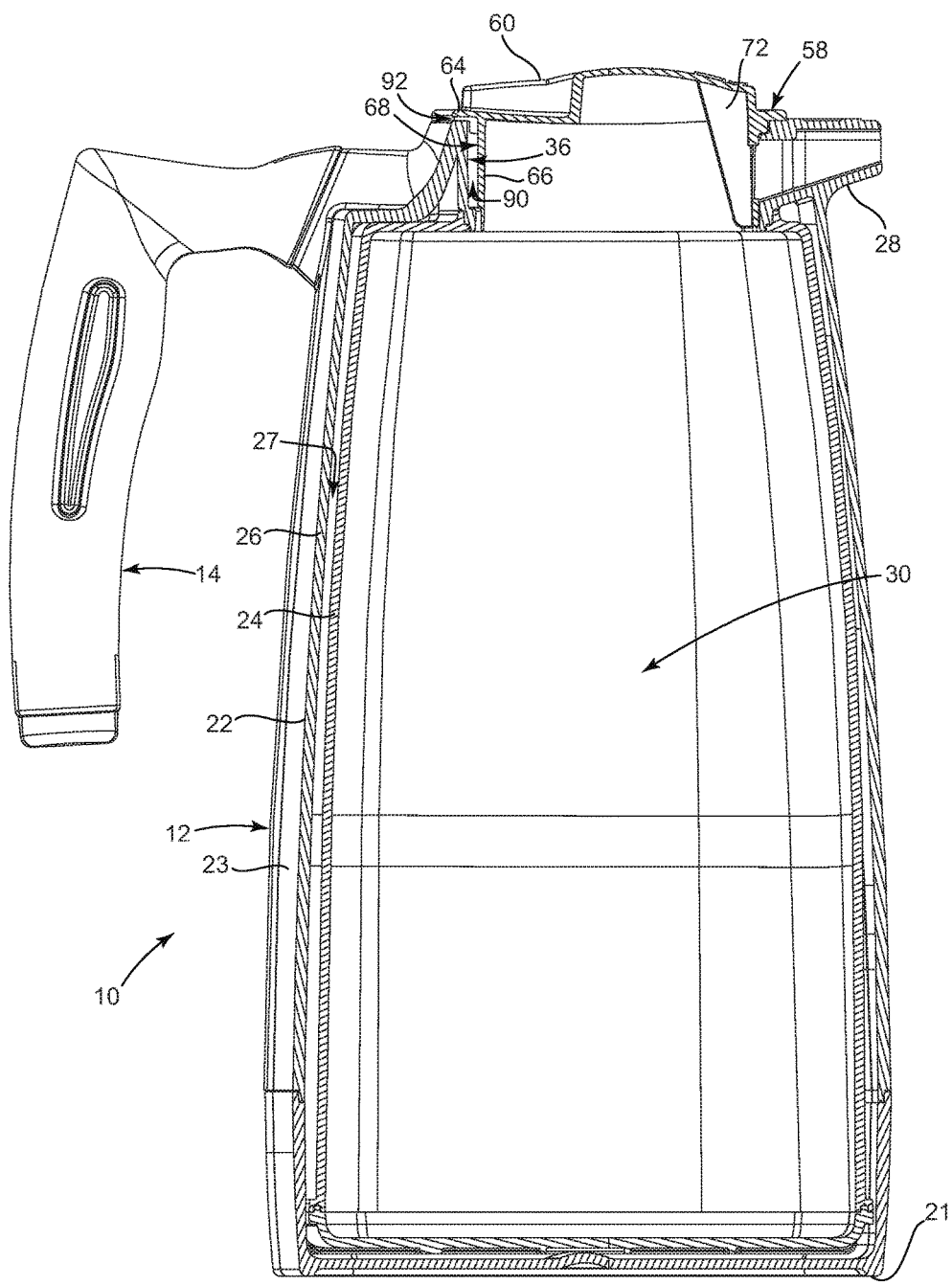
FIG. 10C is a section view of the beverage server of FIG. 10A, showing the cap in the pour configuration, sectioned along the bent section line 10C-10C of FIG. 10B.
Figure 11B:
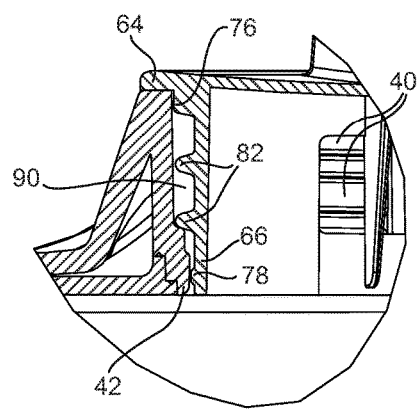
FIG. 11B is an enlarged breakout view of a portion of the beverage server of FIG. 11A encircled in FIG. 11A.
Figure 11A:
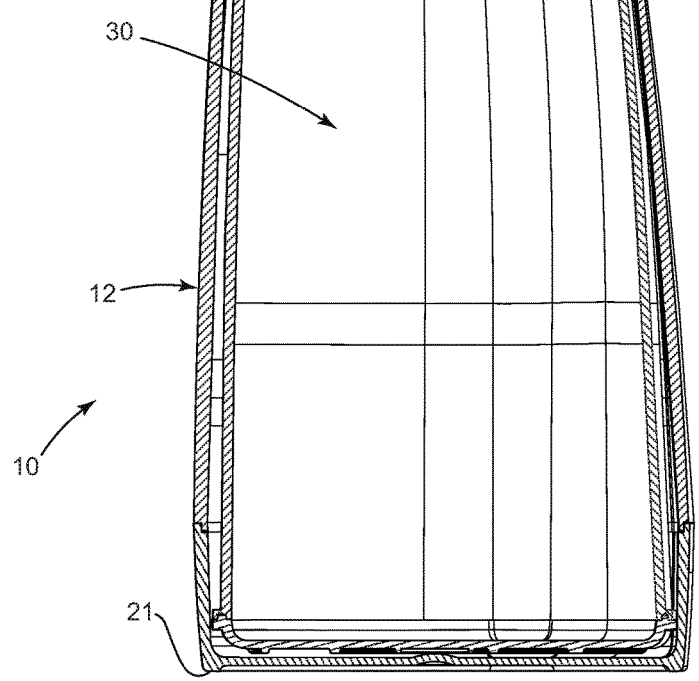
FIG. 11A is a section view of the beverage server of FIG. 8A, showing the cap in the on-off configuration, as seen from and sectioned along the section line 11A-11A of FIG. 8B.
Figure 12B:
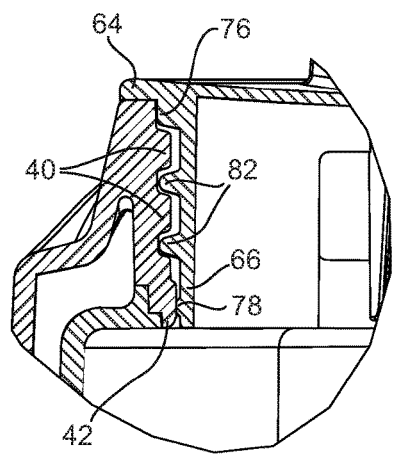
FIG. 12B is an enlarged breakout view of a portion of the beverage server of FIG. 12A encircled in FIG. 12A.
Figure 12A:
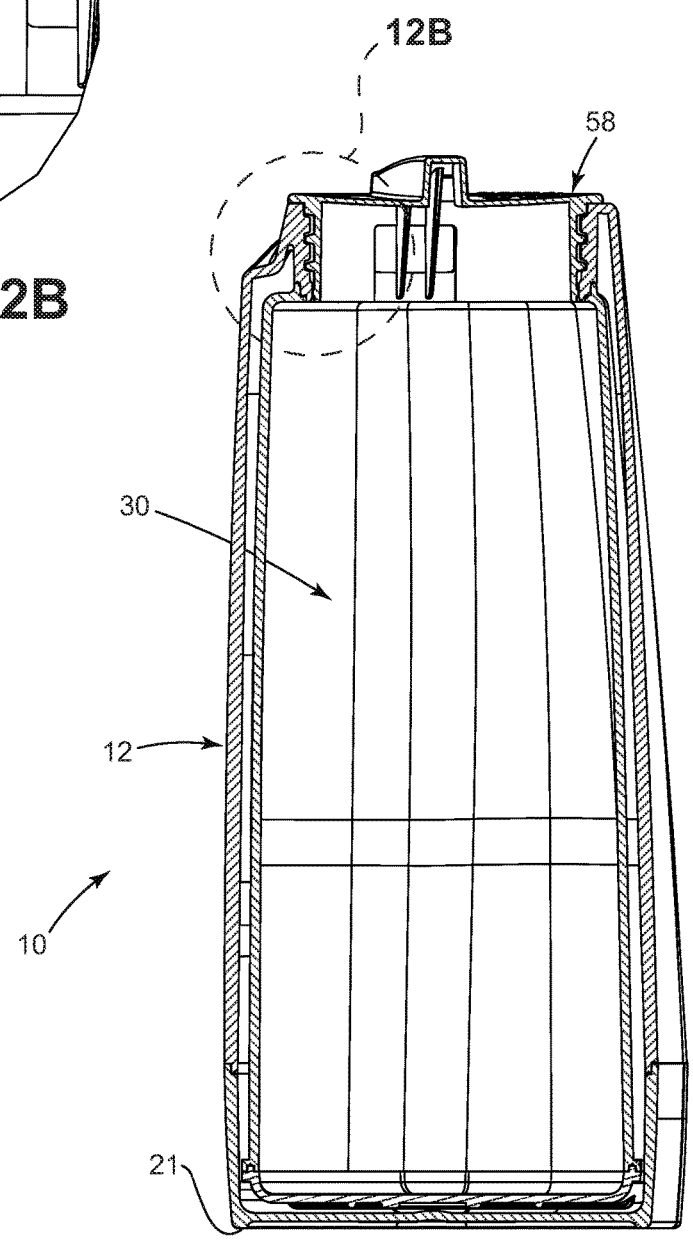
FIG. 12A is a section view of the beverage server of FIG. 9A, showing the cap in the closed configuration, as seen from and sectioned along the section line 12A-12A of FIG. 9B.

FIGS. 8C, 9C, and 10C are section views of the beverage server 10, in the on-off, closed, and pour configurations, respectively, sectioned along the bent section lines 8C-8C, 9C-9C, and 10C-10C, respectively, as indicated on FIGS. 8B, 9B, and 10B, respectively. These views illustrate relationships between structural elements of the cap 58 and the server body 12 in the on-off, closed, and pour configurations, respectively. These views show the server body 12, the outer surface 23, the handle 14, the spout 28, the cap 58, and the cap grip 60. In addition, the container 22 can be seen, and the chamber 30. As described above, and as shown in sectional view, the container 22 includes an inner wall or liner 24 and an outer wall or shell 26. There is a separation space 27 between the liner 24 and the shell 26. The inner wall 24 and outer wall 26 are preferably fabricated independently and bonded together to form the illustrated structure. It will be appreciated that the separation space 27 will provide a thermal barrier between the chamber 30 and the outer surface 23 to help maintain the beverage 4 at a desired temperature while maintaining the outer surface 23 close to the ambient temperature. The separation space 27 is preferably filled with air (not shown), but other solids, liquids, gases, mixtures, or combinations thereof may be used to fill the separation space 27. As is also shown, the base portion 25 includes a bottom rim 21 that is flat so that the server 10 can sit squarely on a flat surface.

Also shown in FIGS. 6A-7D, 8C, 9C, and 10C are the cap lip 64, the cap skirt 66, the outer facing surface 68, the inner facing portion 36, the fluid port 70, the fluid port supports 72, the lip projection 76, the skirt projection 78, and a gap 90 between the outer facing surface 68 of the cap skirt 66 and the inner facing portion 36 of the cap receiving portion 34.

Figure 8D:
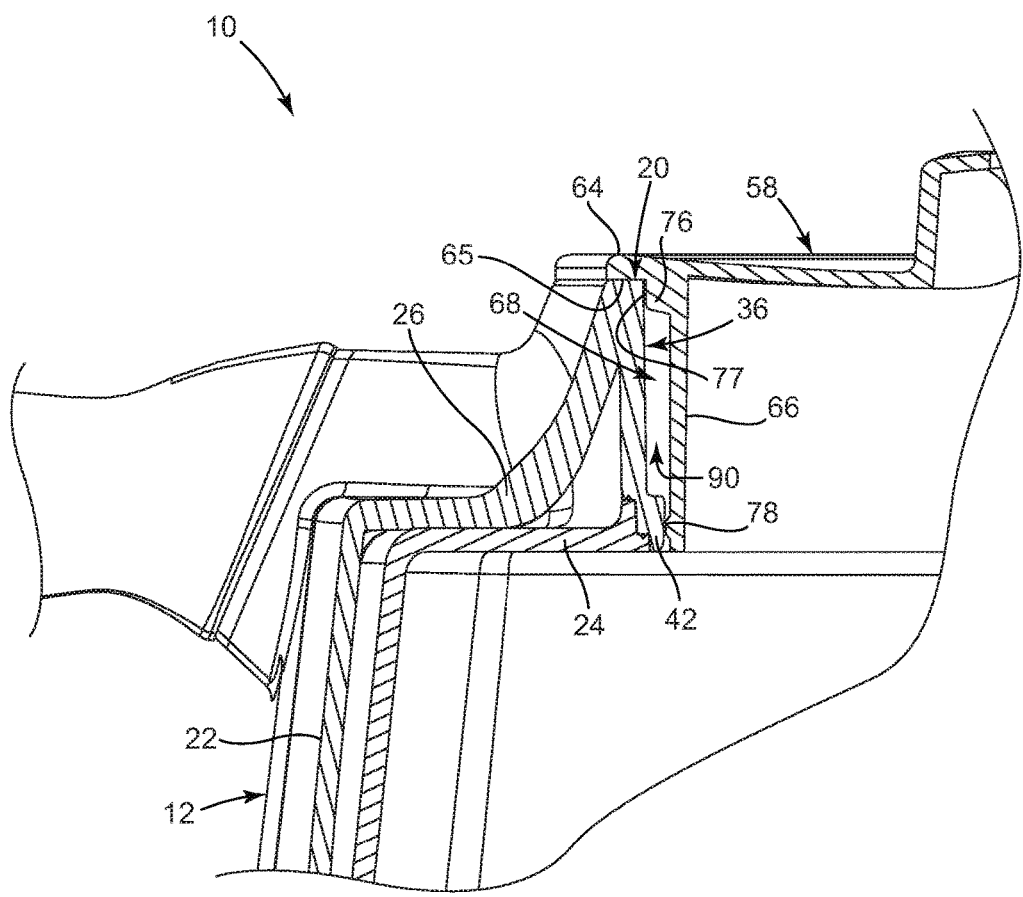
FIG. 8D is an enlarged breakout view of a portion of the beverage server, showing the cap in the on-off configuration, encircled in FIG. 8C.

Referring now also to FIG. 8D, which is an enlarged detail breakout view of a portion of the beverage server 10, in which the cap 58 and the server 10 are in the on-off configuration, as indicated on FIG. 8B, where the cap 58 is shown engaged with the cap receiving portion 34. As briefly described above, cap 58 includes the lip projection 76 located proximate the cap lip 64. When the cap 58 is engaged within the cap receiving portion 34, the lip projection 76 is in close proximity to and engages with the inner facing portion 36. When the cap 58 is engaged with the cap receiving portion 34, the lip projection 76, and specifically the lip projection outer surface 77, is in contact with the inner facing portion 36. When the cap 58 is engaged with the cap receiving portion 34, the lip underside surface 65 will be in contact with the top rim 20. The cap 58 also includes the skirt projection 78. When the cap 58 is engaged with the cap receiving portion 34, the skirt projection 78 is in close proximity to the protruding ring 42 (see also for example FIGS. 4A, 4B, and 11B). When the cap 58 is engaged within the cap receiving portion 34, the skirt projection 78, and specifically the skirt projection outer surface 79, will be in contact with the protruding ring 42, specifically the inner surface 43 of the protruding ring 42.

Figure 13B:
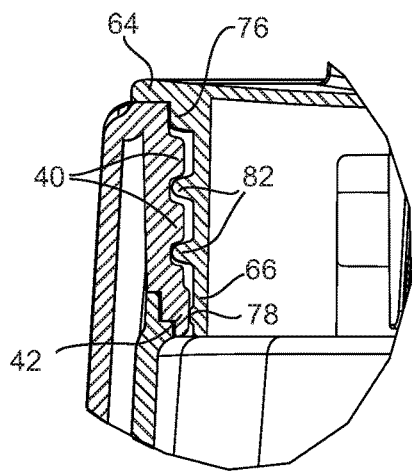
FIG. 13B is an enlarged breakout view of a portion of the beverage server of FIG. 13A encircled in FIG. 13A.
Figure 13A:
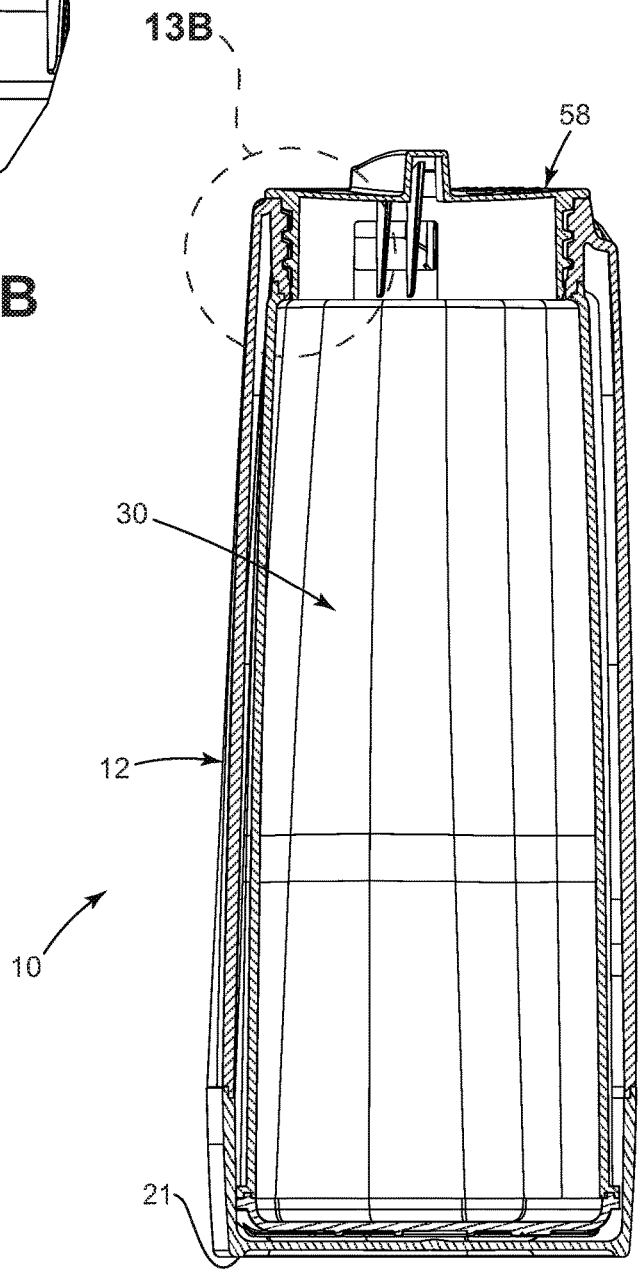
FIG. 13A is a section view of the beverage server of FIG. 10A, showing the cap in the pour configuration, as seen from and sectioned along the section line 13A-13A of FIG. 10B.

Now referring also to FIGS. 11A-13B, FIGS. 11A, 12A, and 13A, are section views of the beverage server 10 in the on-off, closed, and pour configurations, respectively, in which the cap 58 and the server body 12 are sectioned along the section lines 11A-11A, 12A-12A, and 13A-13A, respectively, as indicated on FIGS. 8B, 9B, and 10B, respectively. FIGS. 11B, 12B, and 13B are enlarged detail views of a portion of the beverage server 10 in the on-off, closed, and pour configurations, respectively, as indicated on FIGS. 11A, 12A, and 13A, respectively. FIGS. 11A-13B illustrate further relationships between structural elements of the cap 58 and the server body 12 in the on-off, closed, and pour configurations. In particular, these views illustrate the relationship between the threads 40 and the thread lugs 82, in each of these configurations. FIG. 11B shows the thread lugs 82 disengaged from the threads 40 when the beverage server 10 is in the on-off configuration, allowing the cap 58 to be placed into or removed from the cap receiving portion 34 as described and illustrated elsewhere herein. Similarly, FIG. 12B shows the thread lugs 82 engaged with the threads 40 when the beverage server 10 is in the closed configuration, securing the cap 58 to the server body 12. Similarly, FIG. 13B shows the thread lugs 82 engaged with the threads 40 when the beverage server 10 is in the pour configuration, securing the cap 58 to the server body 12.

Figure 14A:
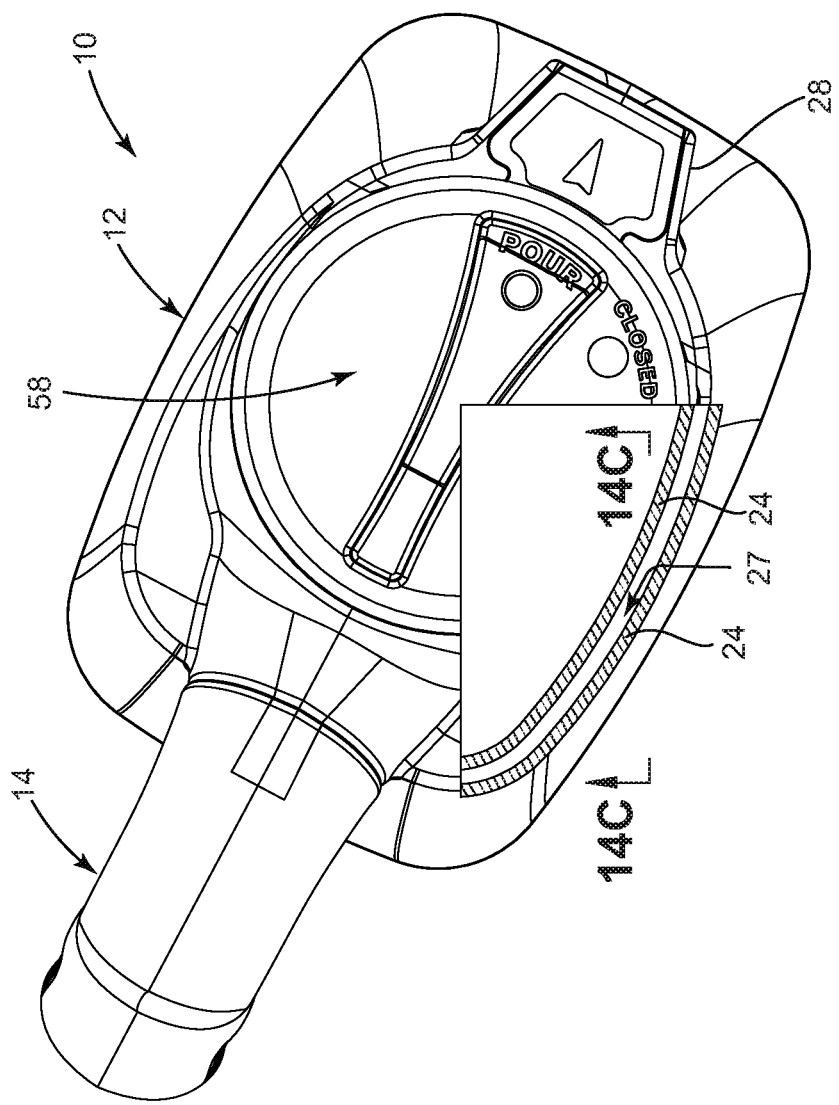
FIG. 14A is a partially-sectioned top plan view of the beverage server of FIGS. 10A-10C, showing the cap in the pour configuration.
Figure 14B:
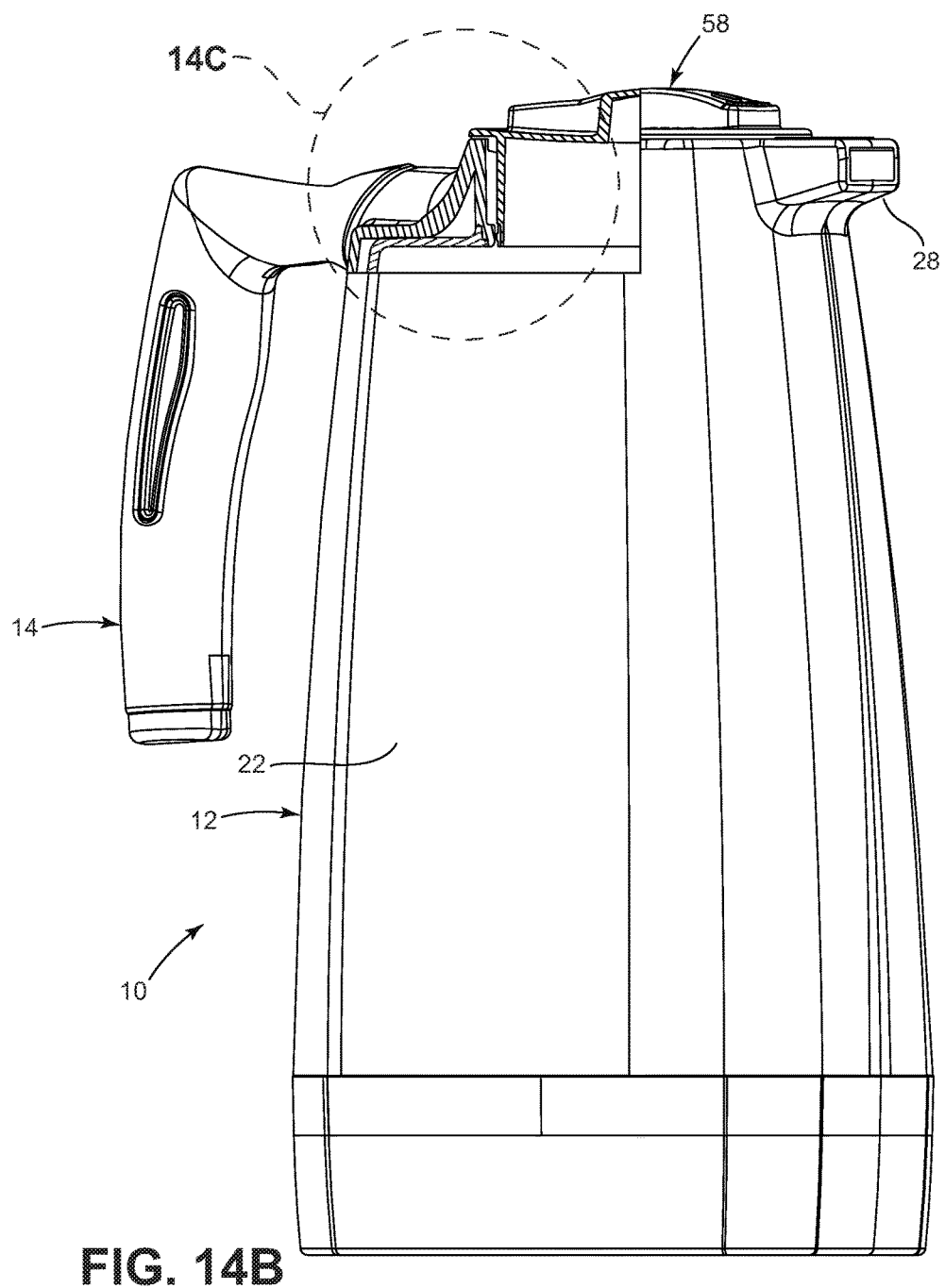
FIG. 14B is a partially-sectioned oblique side view of the beverage server of FIG. 14A, showing the cap in the pour configuration, shown from an oblique side view somewhat toward the front of the server near the spout.
Figure 14C:
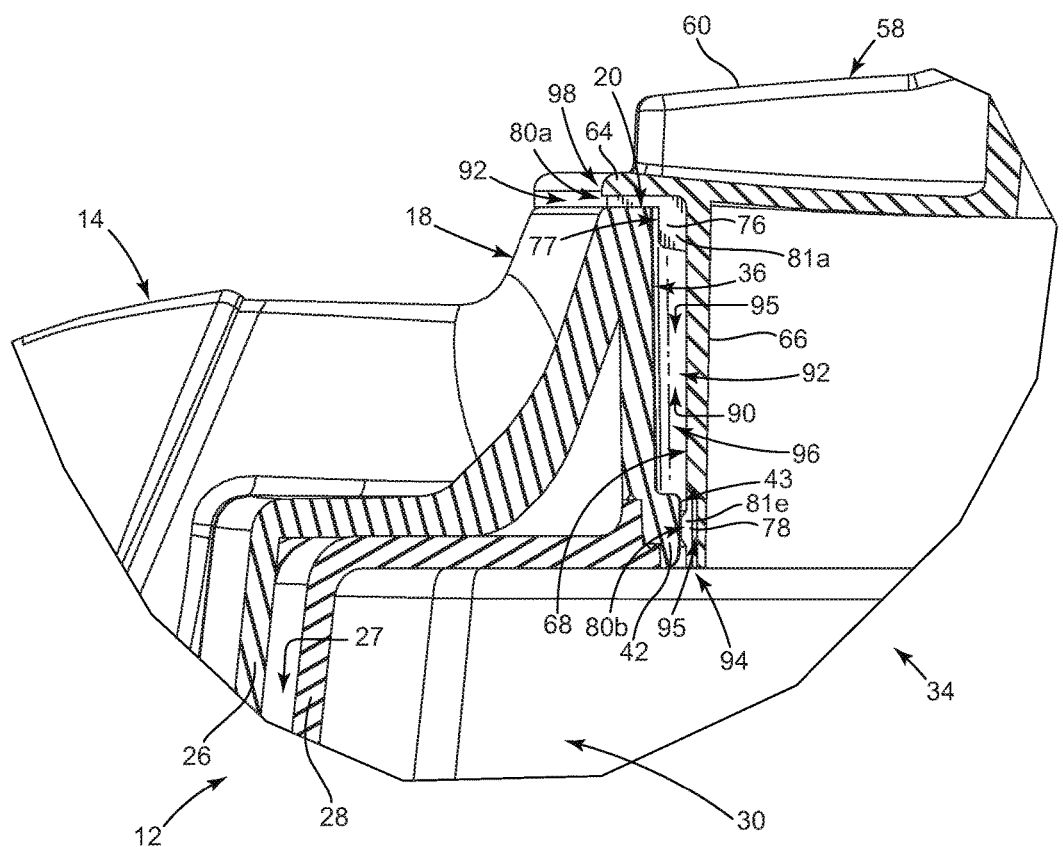
FIG. 14C is an enlarged section view of a portion of the beverage server of FIG. 14A, showing the cap in the pour configuration, sectioned along the section line 14C-14C as indicated on FIG. 14A, illustrating an air vent defined by portions of the server body and the cap, which air vent is also shown in FIGS. 10C and 15, as well.

Now referring also to FIGS. 14A-14C, further structural details of the invention are illustrated. FIG. 14B shows the beverage server 10 in a partially-sectioned view, in the pour configuration, from an oblique side view somewhat towards the spout. FIG. 14A shows the beverage server 10 partially sectioned as in the view of FIG. 14B, but from a top view, to further clarify the views of FIGS. 14B and 14C. FIG. 14C is an enlarged section view of a portion of the beverage server 10, in the pour configuration, sectioned along the section line 14C-14C as indicated on FIG. 14A, illustrating an air vent 92 defined by portions of the server body 12 and the cap 58, as further described below.

When the server 10 is in the pour configuration, and the server body 12 is tilted to dispense liquid beverage 4, as schematically illustrated in FIG. 15, the volume of liquid beverage 4 that passes out from the chamber 30 via the pour spout 28 would presumably reduce the pressure in the chamber 30, and would tend to draw in a similar volume of air 6 via any communication path for venting between the ambient air outside the beverage server 10, and the chamber 30. If there is insufficient venting of the container 22 to allow enough air 6 to pass into the chamber 30 to replace the liquid beverage 4 dispensed from the chamber 30 through the pour spout 28, the pressure in the chamber 30 could be lowered until the beverage or liquid beverage 4 in the pour spout 28 becomes unstable and air 6 is irregularly drawn in through the pour spout 28. This situation would be especially undesirable and could result in a discontinuous or uneven flow of beverage 4 out of the chamber 30 through the pour spout 28, with intermittent bubbles of air 6 being drawn into the chamber 30, and potentially with uneven dispensing and random splashing of the beverage.

In the present beverage server 10, there are two locations where air 6 can pass into the chamber 30 from outside of the server 10 when the beverage server 10 is in the pour configuration: 1) the spout passageway 29a, and 2) between the cap 58 and the cap receiving portion 34. With regard to the first of these locations, when the beverage server 10 is in the pour configuration, and the server body 12 is oriented so that the liquid beverage 4 flows out of the chamber 30, beverage 4 will be dispensing from the chamber 30, out of the server body 12 through the spout passageway 29a, so drawing air 6 in through the spout 28 would result in an uneven and uncertain flow of beverage 4 and an uneven and uncertain flow of air 6. For this reason, venting through the spout passageway 29a during dispensing of the beverage 4 is undesirable. With regard to the second of these locations, as described above, the outer surface 77 of the lip projection 76 is in close proximity to the raised closing surface 38 of the inner facing portion 36, the outer surface 29 of the skirt projection 78 is in close proximity to the ring inner surface 43 of the protruding ring 42, and the lip underside surface 65 is in close proximity to the top rim 20, wherein the close proximity of each of these elements includes engagement between the respective elements that is sufficient to restrict air at normal temperature and pressure (NTP) from passing between the respective elements, thereby limiting the flow of air 6 into the chamber 30 in these regions. In order to overcome the difficulty described above of uneven and uncertain dispensing of beverage 4 from the beverage server 10 resulting from insufficient venting of air 6 into the chamber 30, the beverage server 10 includes an air vent 92, defined by at least one recess in an element of the cap 58 and generally located between the cap 58 and the cap receiving portion 34, as further described and illustrated herein.

As described above, when the cap 58 is engaged with the cap receiving portion 34, the outer surface 77 of the lip projection 76 is in close proximity to, and preferably engaged and in contact with, the raised closing surface 38 of the inner facing portion 36, the outer surface 79 of the skirt projection 78 is in close proximity to, and preferably engaged and in contact with, the ring inner surface 43 of the protruding ring 42, and the lip underside surface 65 is held in close proximity to, and preferably engaged and in contact with, the top rim 20, by engagement of the thread lugs 82 with the threads 40 when the server 10 is in the pour configuration so that air is restricted from passing between these respective elements when under normal temperature and pressure (NTP). The server 10 is constructed and arranged to function as described herein when under normal temperature and pressure (NTP). The server 10 is further constructed and arranged to function as described herein when in the typical conditions expected during use of a beverage server, including at least the temperatures and pressures anticipated in passenger environments of an aircraft or other passenger transporting vehicles, and with beverage 4 being in the typical temperature range for serving such beverages, including iced beverages and hot beverages, such as coffee.

Referring now again to FIGS. 6B, 7B-7D and 14C, as described herein, the cap 58 includes the lip projection recess 80a in both the underside surface 65 of the cap lip 64 and the outer surface 77 of the lip projection 76, each of which help to define the air vent 92 that allows air 6 to pass between the cap lip 64 and the top rim 20, and between the outer surface 77 of the lip projection 76 and raised closing surface 38 of the inner facing portion 36. As such, the lip projection recess 80a is essentially a recess or a cutaway in two surfaces that would otherwise engage surfaces of the cap receiving portion 34 when the cap 58 is in the pour configuration, so as to restrict air from flowing between the respective engaged surfaces. The skirt projection recess 80b is also a recess or a cutaway in more than one surface, but in the case of the skirt recess 80b, only one of the surfaces recessed or cutaway to form the recess 80b is a surface that would otherwise be engaged with a surface of the cap receiving portion 34 of the top portion 18, so as to restrict air from passing between the surface and a surface associated with the cap receiving portion 34 when the cap 58 is secured within the top opening 32 in the pour configuration. That surface is the outer surface 79 of the skirt projection 78, which is part of the closing region 86 of the outer facing surface 68, which would otherwise engage the raised closing surface 38 of the inner facing portion 36. Thus, the lip projection recess 80a helps to provide in part an air vent 92 between the cap 58 and the cap receiving portion 34.

Referring now again to FIGS. 6A-7D, 14C and 15, the air vent 92 is created by cutting away the underside surface 65 and the outer surface 77 of the lip projection 76 to create recesses in the underside surface 65 and the outer surface 77 of the lip projection 76; and by "cutting away" the outer surface 79 of the skirt projection 78 and an adjacent portion of the clearance region 85 of the outer facing surface 68 of the cap skirt 66. The underside surface 65 and the outer surface 77 of the lip projection 76 are constructed and arranged to engage the top rim 20 and the raised closing surface 38 of the inner facing portion 36, respectively, so as to restrict air from passing there between when the cap 58 is secured within the top opening 32 in the pour configuration and the air is at normal temperature and pressure (NTP). Similarly, the outer surface 79 of the skirt projection 78 is constructed and arranged to engage the ring inner surface 43 of the protruding ring 42 so as to restrict air from passing there between when the cap 58 is secured within the top opening 32 in the pour configuration and the air is at normal temperature and pressure (NTP). The respective recesses in the respective surfaces on the cap 58, preferably create a separation between the otherwise engaged surfaces to in part define the air vent 92 and permit air 6 to pass through the air vent 92 into the chamber 30 when the liquid beverage 4 is poured out of the server 10 as shown in FIG. 15.

As described herein, the cap 58 preferably includes the skirt projection recess 80b, which allows air 6 to pass between the skirt projection 78 and the ring inner surface 43 of the protruding ring 42. Thus, the skirt projection recess 80b provides a venting path 95 between the cap skirt 66 and the inner facing portion 36. The further cutaways in the cap 58, and more specifically the surfaces of the cap 58 which define the lip projection recess 80a, the skirt projection recess 80b, together with the outer facing surface 68, and the inner facing portion 36, further define the air vent 92 having a vent passageway 96 for passage of air 6 from a vent outer end 98 to a vent inner end 94. The air vent 92 provides for a flow of air 6 into the chamber 30 along a vent passageway 96. Air 6 is preferably drawn into the chamber 30 when the beverage or liquid beverage 4 is dispensed via the pour spout 28 to dispense beverage 4 in a desired manner. The air vent 92 can provide for the dispensing of the beverage or liquid beverage 4 in a continuous, even, smooth, uninterrupted, predictable, or controllable manner, and will preferably avoid the uneven dispensing or splashing which could otherwise occur, as described above. The air vent 92 is preferably located so that, when the beverage server 10 is in the pour configuration and is oriented to dispense beverage or liquid beverage 4 from the server 10 via the spout passageway 29a when the server 10 is oriented as schematically illustrated in FIG. 15, the air vent 92 will be located higher than the internal opening 29b of the spout passageway 29a, so that air 6 will pass through the air vent 92 into the chamber 30, as shown in FIG. 15 by the arrows passing through the air vent 92 and into the chamber 30, as beverage or liquid beverage 4 is dispensed through the spout passageway 29a.

FIG. 15 is a section view of the beverage server 10, sectioned along the bent section line 10C-10C as indicated on FIG. 10B, when the server 10 is in the pour configuration and is tilted to dispense beverage 4 via the spout passageway 29a and the pour spout 28, and air 6 is drawn in via the air vent 92. The air vent 92 is preferably located in a position that is removed from the pour spout 28 in order to reduce the likelihood of beverage 4 passing from the chamber 30 into the air vent 92 when the beverage server 10 is tilted to dispense the beverage 4 via the pour spout 28.

As described above, the present invention is a beverage server 10 for retaining a beverage or liquid beverage 4 in which the beverage server 10 includes: 1) a server body 12 including an open top container 22 defining a chamber 30 for receiving and retaining the liquid beverage 4; the open top container 22 having a top portion 18 and a base portion 19, the top portion 18 including a top rim 20, a cap receiving portion 34 and a pour spout 28; the pour spout 28 including a spout passageway 29a for dispensing the liquid beverage 4 from the chamber 30, and the cap receiving portion 34 defining a top opening 32; and 2) a cap 58 for engagement within the top opening 32; the cap 58 having a cap lip 64 and the cap lip 64 having an underside surface 65; wherein the underside surface 65 of the cap lip 64 is constructed and arranged to engage the top rim 20 when the cap 58 is engaged within the top opening 32 in a pour configuration so as to restrict air 6 from flowing between the underside surface 65 and the top rim 20; wherein, when the cap 58 is engaged within the top opening 32 in the pour configuration, the cap 58 will be positioned so that liquid beverage 4 in the chamber 30 can pass into the spout passageway 29a and out of the server 10 through the pour spout 28; wherein the cap 58 includes an lip projection recess 80a in the underside surface 65 of the cap lip 64; wherein the lip projection recess 80a cooperates with top rim 20 to define in part an air vent 92 that allows air 6 to pass into the chamber 30 from outside of the server 10 when the cap 58 is in the pour configuration and the server body 12 is oriented so that liquid beverage 4 will flow out of the chamber 30 and through the spout passageway 29a under the force of gravity. In preferred embodiments, the cap receiving portion 34 is constructed and arranged to retain the cap 58 within the top opening 32 in one of three configurations selected from the group consisting of: 1) an on-off configuration wherein the cap can be positioned in a first engaged position in which the cap can be removed from the top opening; 2) a closed configuration in which the cap prevents liquid beverage in the chamber from passing out of the chamber into the spout passageway; and 3) a pour configuration in which the cap is positioned so that liquid beverage in the chamber can pass into the spout passageway and out of the server through the pour spout. The cap receiving portion 34 preferably further includes an inner facing portion 36 having a raised closing surface 38 and the cap 58 has a cap skirt 66; wherein the cap receiving portion 34 further includes an inner facing portion 36 having a raised closing surface 38; and wherein the raised closing surface 38 includes an inner surface 43 of a protruding ring 42 that encircles the top opening 32; the cap skirt 66 has an outer facing surface 68 and the outer facing surface 68 of the cap skirt 66 has a clearance region 85 and a closing region 86; and the closing region 86 of the outer facing surface 68 is constructed and arranged to engage the raised closing surface 38 of the inner facing portion 36 so as to restrict air 6 from passing between the closing region 86 of the outer facing surface 68 of the cap skirt 66 and the raised closing surface 38 when the cap 58 is engaged within the top opening 32 in a pour configuration. The cap 58 preferably includes an skirt projection recess 80b in the closing region and the clearance region of the outer facing surface of the cap skirt and the skirt projection recess 80b cooperates with the raised closing surface 38 to further define the air vent 92 that allows air 6 to pass into the chamber 30 from outside of the server 10 when the cap 58 is engaged in the cap receiving portion 34 in the pour configuration.

In preferred embodiments, the cap 58 includes a fluid port 70 in the outer facing surface 68 of the cap skirt 66 so that the outer facing surface 68 completely surrounds the fluid port 70; wherein the fluid port 70 communicates with the spout passageway 29a when the cap 58 is in the pour configuration so that liquid beverage 4 can flow out of the chamber 30, through the fluid port 70 and out of the server 10 through the spout passageway 29a when the cap 58 is in the pour configuration. The outer facing surface 68 of the cap skirt 66 is preferably engaged with the raised closing surface 38 of the inner facing portion 36 of the cap receiving portion 34 when the cap 58 is in the closed configuration; and wherein the fluid port 70 is not in communication with the spout passageway 29a when the cap 58 is in the closed configuration; wherein the at least one fluid port support 72 is secured to the cap skirt 66 on opposing sides of the fluid port 70 so as to bridge the fluid port 70 and connect with the cap skirt 66 on each side of the fluid port 70. In other embodiments, the inner facing portion 38 of the cap receiving portion 34 includes at least one raised thread 40 and the cap skirt 66 includes at least one thread lug 82 for engagement with the at least one raised thread 40; wherein the cap 58 will be secured to the server body 12 when the thread lug 82 is engaged with the raise thread 40 when the cap 58 is in either the closed configuration or the pour configuration and/or the cap 58 preferably includes a lip projection 76 having a lip projection outer surface 77 that engages the inner facing portion 38 of the cap receiving portion 34 when the cap 58 resides within the top opening 32 in the pour configuration; wherein the lip projection 76 includes a lip projection recess 80a in the outer surface 77 of the lip projection 76 that cooperates with the inner facing portion 36 to further define the air vent 92. The server body preferably includes a handle 14 secured to the open top container 22 and the base portion preferably includes a raised bottom rim.

In a further embodiment, the beverage server 10 has a server body 12 including an open top container 22 defining a chamber 30 for receiving and retaining the liquid beverage 4; the open top container 22 having a top portion 18 and a base portion 19, the top portion 18 including a top rim 20, a cap receiving portion 34 and a pour spout 28; the pour spout 28 including a spout passageway 29a for dispensing the liquid beverage 4 from the chamber 30, and the cap receiving portion 34 defining a top opening 32; and a cap 58 for engagement within the top opening 32; wherein the cap 58 has a cap skirt 66 and the cap skirt 66 has an outer facing surface 68; wherein the cap receiving portion 34 further includes an inner facing portion 36 having a raised closing surface 38; wherein the raised closing surface 38 includes an inner surface 43 of a protruding ring 42 that encircles the top opening 32; wherein the outer facing surface 68 of the cap skirt 66 is constructed and arranged to engage the raised closing surface 38 of the inner facing portion 36 so as to restrict air 6 from passing between the outer facing surface 68 and the raised closing surface 38 when the cap 58 is engaged within the top opening 32 in a pour configuration; the cap 58 further having a cap lip 64 and the cap lip 64 having an underside surface 65; wherein the underside surface 65 of the cap lip 64 is constructed and arranged to engage the top rim 20 when the cap 58 is engaged within the top opening 32 in a pour configuration so as to restrict air 6 from flowing between the underside surface 65 and the top rim 20; wherein the cap 58 includes an lip projection recess 80a in the underside surface 65 of the cap lip 64; wherein the lip projection recess 80a cooperates with top rim 20 to define in part an air vent 92 that allows air 6 to pass into the chamber 30 from outside of the server 10 when the cap 58 is in the pour configuration and the server body 10 is oriented so that liquid beverage 4 will flow out of the chamber 30 and through the spout passageway 29a under the force of gravity; wherein the cap 58 includes an skirt projection recess 80b in the outer facing surface 68 of the cap skirt 66 and the skirt projection recess 80b cooperates with the raised closing surface 38 to further define in part the air vent 92.

The present invention also includes a method of providing a vented beverage server 10 for retaining a liquid beverage 4, wherein the vented beverage server 10 includes: 1) a server body 12 including an open top container 22 defining a chamber 30 for receiving and retaining the liquid beverage 4; the open top container 22 has a top portion 18 and a base portion 19, the top portion 18 including a top rim 20, a cap receiving portion 34 and a pour spout 28; the pour spout 28 including a spout passageway 29a for dispensing the liquid beverage 4 from the chamber 30, and the cap receiving portion 34 defines a top opening 32; wherein the cap receiving portion 34 further includes an inner facing portion 36 having a raised closing surface 38 and the raised closing surface includes an inner surface 43 of a protruding ring 42 that encircles the top opening 32; wherein the method of providing a vented beverage server 10 includes the step of: 1) providing a cap 58 for engagement within the top opening 32; wherein the cap 58 has a cap skirt 66 and the cap skirt 66 has an outer facing surface 68; wherein the outer facing surface 68 of the cap skirt 66 is constructed and arranged to engage the raised closing surface 38 of the inner facing portion 36 so as to restrict air 6 from passing between the outer facing surface 68 and the raised closing surface 38 when the cap 58 is engaged within the top opening 32 in a pour configuration; the cap 58 further having a cap lip 64 and the cap lip 64 having an underside surface 65; wherein the underside surface 65 of the cap lip 64 is constructed and arranged to engage the top rim 20 when the cap 58 is engaged within the top opening 32 in a pour configuration so as to restrict air from flowing between the underside surface 65 and the top rim 20; wherein the cap 58 further includes an lip projection recess 80a in the underside surface 65 of the cap lip 64; wherein the lip projection recess 80a cooperates with top rim 20 to define in part an air vent 92 that allows air 6 to pass into the chamber 30 from outside of the server 10, as represented by the arrows directed into the server 10 through the air vent 92, as shown in FIG. 15, when the cap 58 is in the pour configuration and the server body 12 is oriented so that liquid beverage 4 will flow out of the chamber 30 and through the spout passageway 29a under the force of gravity. In a further embodiment, the cap 58 will further include a skirt projection recess 80b in the outer facing surface 68 of the cap skirt 66 and the skirt projection recess 80b cooperates with the raised closing surface 38 to further define in part the air vent 92 and/or a lip projection 76 having a lip projection outer surface 77 that engages the inner facing portion 36 of the cap receiving portion 34 when the cap 58 resides within the top opening 32; wherein the lip projection 76 includes a lip projection recess 80a in the outer surface 77 of the lip projection 76 that cooperates with the inner facing portion 36 to further define the air vent 92.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A beverage server for retaining a liquid beverage, the beverage server comprising:
a server body including an open top container defining a chamber for receiving and retaining the liquid beverage; the open top container having a top portion and a base portion, the top portion including a top rim, a cap receiving portion and a pour spout; the pour spout including a spout passageway for dispensing the liquid beverage from the chamber, and the cap receiving portion defining a top opening; and
a cap for engagement within the top opening; the cap having a cap lip and the cap lip having an underside surface; wherein the underside surface of the cap lip is constructed and arranged to engage the top rim when the cap is engaged within the top opening in a pour configuration so as to restrict air from flowing between the underside surface and the top rim; wherein, when the cap is engaged within the top opening in the pour configuration, the cap will be positioned so that the liquid beverage in the chamber can pass into the spout passageway and out of the server through the pour spout; wherein the cap includes a lip projection recess in the underside surface of the cap lip; wherein the lip projection recess cooperates with the top rim to define in part an air vent that allows air to pass into the chamber from outside of the server when the cap is in the pour configuration and the server body is oriented so that the liquid beverage will flow out of the chamber and through the spout passageway under the force of gravity.

2. The beverage server of claim 1; wherein the cap receiving portion is constructed and arranged to retain the cap within the top opening in one of three configurations selected from the group consisting of: 1) an on-off configuration wherein the cap can be positioned in a first engaged position in which the cap can be removed from the top opening; 2) a closed configuration in which the cap prevents the liquid beverage in the chamber from passing out of the chamber into the spout passageway; and 3) a pour configuration in which the cap is positioned so that the liquid beverage in the chamber can pass into the spout passageway and out of the server through the pour spout.

3. The beverage server of claim 1; wherein the cap receiving portion further includes an inner facing portion having a raised closing surface and the cap has a cap skirt; wherein the cap receiving portion further includes an inner facing portion having a raised closing surface; wherein the raised closing surface includes an inner surface of a protruding ring that encircles the top opening; wherein the cap skirt has an outer facing surface and the outer facing surface of the cap skirt has a clearance region and a closing region; wherein the closing region of the outer facing surface is constructed and arranged to engage the raised closing surface of the inner facing portion so as to restrict air from passing between the closing region of the outer facing surface of the cap skirt and the raised closing surface when the cap is engaged within the top opening in the pour configuration; wherein the cap includes a skirt projection recess in the closing region and the clearance region of the outer facing surface of the cap skirt and the skirt projection recess cooperates with the raised closing surface to further define the air vent that allows air to pass into the chamber from outside of the server when the cap is engaged in the cap receiving portion in the pour configuration.

4. The beverage server of claim 2; wherein the cap includes a fluid port in the outer facing surface of the cap skirt so that the outer facing surface completely surrounds the fluid port; wherein the fluid port communicates with the spout passageway when the cap is in the pour configuration so that the liquid beverage can flow out of the chamber, through the fluid port and out of the server through the spout passageway when the cap is in the pour configuration.

5. The beverage server of claim 4; wherein the outer facing surface of the cap skirt is engaged with the raised closing surface of the inner facing portion of the cap receiving portion when the cap is in the closed configuration; and wherein the fluid port is not in communication with the spout passageway when the cap is in the closed configuration.

6. The beverage server of claim 4; wherein the cap includes at least one fluid port support; wherein the at least one fluid port support is secured to the cap skirt on opposing sides of the fluid port so as to bridge the fluid port and connect with the cap skirt on each side of the fluid port.

7. The beverage server of claim 4; wherein the inner facing portion of the cap receiving portion includes at least one raised thread and the cap skirt includes at least one thread lug for engagement with the raised thread; wherein the cap will be secured to the server body when the at least one thread lug is engaged with the at least one raise thread when the cap is in either the closed configuration or the pour configuration.

8. The beverage server of claim 1; wherein the cap includes a lip projection having a lip projection outer surface that engages the inner facing portion of the cap receiving portion when the cap resides within the top opening in the pour configuration; wherein the lip projection recess is also a recess in the outer surface of the lip projection that cooperates with the inner facing portion to further define the air vent.

9. The beverage server of claim 1; wherein the server body includes a handle secured to the open top container.

10. The beverage server of claim 1; wherein the base portion includes a raised bottom rim.

11. A beverage server for retaining a liquid beverage, the beverage server comprising:
a server body including an open top container defining a chamber for receiving and retaining the liquid beverage; the open top container having a top portion and a base portion, the top portion including a top rim, a cap receiving portion and a pour spout; the pour spout including a spout passageway for dispensing the liquid beverage from the chamber, and the cap receiving portion defining a top opening; and
a cap for engagement within the top opening; wherein the cap has a cap skirt and the cap skirt has an outer facing surface; wherein the cap receiving portion further includes an inner facing portion having a raised closing surface; wherein the raised closing surface includes an inner surface of a protruding ring that encircles the top opening; wherein the cap skirt has an outer facing surface and the outer facing surface of the cap skirt has a closing region that is constructed and arranged to engage the raised closing surface of the inner facing portion so as to restrict air from passing between the closing region of the outer facing surface of the cap skirt and the raised closing surface when the cap is engaged within the top opening in a pour configuration; wherein the cap includes a skirt projection recess in the closing region of the outer facing surface of the cap skirt and the skirt projection recess cooperates with the raised closing surface to define in part an air vent that allows air to pass into the chamber from outside of the server when the cap is engaged in the cap receiving portion in the pour configuration.

12. The beverage server of claim 11; wherein the cap receiving portion is constructed and arranged to retain the cap within the top opening in one of three configurations selected from the group consisting of: 1) an on-off configuration wherein the cap can be positioned in a first engaged position in which the cap can be removed from the top opening; 2) a closed configuration in which the cap prevents the liquid beverage in the chamber from passing out of the chamber into the spout passageway; and 3) a pour configuration in which the cap is positioned so that the liquid beverage in the chamber can pass into the spout passageway and out of the server through the pour spout.

13. The beverage server of claim 11; wherein the cap has a cap lip and the cap lip has an underside surface; wherein the underside surface of the cap lip is constructed and arranged to engage the top rim when the cap is engaged within the top opening in a pour configuration so as to restrict air from flowing between the underside surface and the top rim; wherein, when the cap is engaged within the top opening in the pour configuration, the cap will be positioned so that the liquid beverage in the chamber can pass into the spout passageway and out of the server through the pour spout; wherein the cap includes a lip projection recess in the underside surface of the cap lip; wherein the lip projection recess cooperates with the top rim to further define the air vent that allows air to pass into the chamber from outside of the server when the cap is engaged in the cap receiving portion in the pour configuration.

14. The beverage server of claim 12; wherein the cap includes a fluid port in the outer facing surface of the cap skirt so that the outer facing surface completely surrounds the fluid port; wherein the fluid port communicates with the spout passageway when the cap is in the pour configuration so that the liquid beverage can flow out of the chamber, through the fluid port and out of the server through the spout passageway when the cap is in the pour configuration.

15. The beverage server of claim 14; wherein the outer facing surface of the cap skirt is engaged with the raised closing surface of the inner facing portion of the cap receiving portion when the cap is in the closed configuration; and wherein the fluid port is not in communication with the spout passageway when the cap is in the closed configuration.

16. The beverage server of claim 14; wherein the cap includes at least one fluid port support; wherein the at least one fluid port support is secured to the cap skirt on opposing sides of the fluid port so as to bridge the fluid port and connect with the cap skirt on each side of the fluid port.

17. The beverage server of claim 14; wherein the inner facing portion of the cap receiving portion includes at least one raised thread and the cap skirt includes at least one thread lug for engagement with the at least one raised thread; wherein the cap will be secured to the server body when the at least one thread lug is engaged with the at least one raise thread when the cap is in either the closed configuration or the pour configuration.

18. The beverage server of claim 11; wherein the cap includes a lip projection having a lip projection outer surface that engages the inner facing portion of the cap receiving portion when the cap resides within the top opening; wherein the lip projection includes a lip projection recess in the outer surface of the lip projection that cooperates with the inner facing portion to further define the air vent.

19. The beverage server of claim 11; wherein the outer facing surface of the cap skirt has a clearance region and a closing region; wherein the skirt projection recess in the closing region of the outer facing surface of the cap skirt extends into the clearance region of the outer facing surface.

20. The beverage server of claim 11; wherein the base portion includes a raised bottom rim and the server body includes a handle secured to the open top container.

21. A beverage server for retaining a liquid beverage, the beverage server comprising:
a server body including an open top container defining a chamber for receiving and retaining the liquid beverage; the open top container having a top portion and a base portion, the top portion including a top rim, a cap receiving portion and a pour spout; the pour spout including a spout passageway for dispensing the liquid beverage from the chamber, and the cap receiving portion defining a top opening; and
a cap for engagement within the top opening; wherein the cap has a cap skirt and the cap skirt has an outer facing surface; wherein the cap receiving portion further includes an inner facing portion having a raised closing surface; wherein the raised closing surface includes an inner surface of a protruding ring that encircles the top opening; wherein the outer facing surface of the cap skirt is constructed and arranged to engage the raised closing surface of the inner facing portion so as to restrict air from passing between the outer facing surface and the raised closing surface when the cap is engaged within the top opening in a pour configuration; the cap further having a cap lip and the cap lip having an underside surface; wherein the underside surface of the cap lip is constructed and arranged to engage the top rim when the cap is engaged within the top opening in a pour configuration so as to restrict air from flowing between the underside surface and the top rim; wherein the cap includes a lip projection recess in the underside surface of the cap lip; wherein the lip projection recess cooperates with the top rim to define in part an air vent that allows air to pass into the chamber from outside of the server when the cap is in the pour configuration and the server body is oriented so that the liquid beverage will flow out of the chamber and through the spout passageway under the force of gravity; wherein the cap includes a skirt projection recess in the outer facing surface of the cap skirt and the skirt projection recess cooperates with the raised closing surface to further define in part the air vent.

22. The beverage server of claim 21; wherein the cap receiving portion is constructed and arranged to retain the cap within the top opening in one of three configurations selected from the group consisting of: 1) an on-off configuration wherein the cap can be positioned in a first engaged position in which the cap can be removed from the top opening; 2) a closed configuration in which the cap prevents the liquid beverage in the chamber from passing out of the chamber into the spout passageway; and 3) a pour configuration in which the cap is positioned so that the liquid beverage in the chamber can pass into the spout passageway and out of the server through the pour spout.

23. The beverage server of claim 21; wherein the cap includes a fluid port in the outer facing surface of the cap skirt so that the outer facing surface completely surrounds the fluid port; wherein the fluid port communicates with the spout passageway when the cap is in the pour configuration so that the liquid beverage can flow out of the chamber, through the fluid port and out of the server through the spout passageway when the cap is in the pour configuration.

24. The beverage server of claim 21; wherein the outer facing surface of the cap skirt is engaged with the raised closing surface of the inner facing portion of the cap receiving portion when the cap is in the closed configuration; and wherein the fluid port is not in communication with the spout passageway when the cap is in the closed configuration.

25. The beverage server of claim 24; wherein the cap includes at least one fluid port support; wherein the at least one fluid port support is secured to the cap skirt on opposing sides of the fluid port so as to bridge the fluid port and connect with the cap skirt on each side of the fluid port.

26. The beverage server of claim 22; wherein the inner facing portion of the cap receiving portion includes at least one raised thread and the cap skirt includes at least one thread lug for engagement with the at least one raised thread; wherein the cap will be secured to the server body when the at least one thread lug is engaged with the at least one raise thread when the cap is in either the closed configuration or the pour configuration.

27. The beverage server of claim 21; wherein the cap includes a lip projection having a lip projection outer surface that engages the inner facing portion of the cap receiving portion when the cap resides within the top opening; wherein the lip projection recess is also a recess in the outer surface of the lip projection that cooperates with the inner facing portion to further define the air vent.

28. The beverage server of claim 21; wherein the outer facing surface of the cap skirt has a clearance region and a closing region; wherein the skirt projection recess in the closing region of the outer facing surface of the cap skirt extends into the clearance region of the outer facing surface.

29. The beverage server of claim 21; wherein the base portion includes a raised bottom rim and the server body includes a handle secured to the open top container.

30. A method of providing a vented beverage server for retaining a liquid beverage, wherein the vented beverage server includes: 1) a server body including an open top container defining a chamber for receiving and retaining the liquid beverage; the open top container has a top portion and a base portion, the top portion including a top rim, a cap receiving portion and a pour spout; the pour spout including a spout passageway for dispensing the liquid beverage from the chamber, and the cap receiving portion defines a top opening; wherein the cap receiving portion further includes an inner facing portion having a raised closing surface and the raised closing surface includes an inner surface of a protruding ring that encircles the top opening; wherein the method of providing a vented beverage server comprises the step of:

1) providing a cap for engagement within the top opening; wherein the cap has a cap skirt and the cap skirt has an outer facing surface; wherein the outer facing surface of the cap skirt is constructed and arranged to engage the raised closing surface of the inner facing portion so as to restrict air from passing between the outer facing surface and the raised closing surface when the cap is engaged within the top opening in a pour configuration; the cap further having a cap lip and the cap lip having an underside surface; wherein the underside surface of the cap lip is constructed and arranged to engage the top rim when the cap is engaged within the top opening in the pour configuration so as to restrict air from flowing between the underside surface and the top rim; wherein the cap further includes a lip projection recess in the underside surface of the cap lip; wherein the lip projection recess cooperates with the top rim to define in part an air vent that allows air to pass into the chamber from outside of the server when the cap is in the pour configuration and the server body is oriented so that the liquid beverage will flow out of the chamber and through the spout passageway under the force of gravity.

31. The method of providing a vented beverage server for retaining a liquid beverage of claim 30, wherein the cap, provided in the step of providing, further includes a skirt projection recess in the outer facing surface of the cap skirt and the skirt projection recess cooperates with the raised closing surface to further define the air vent.

32. The method of providing a vented beverage server for retaining a liquid beverage of claim 30, wherein the cap, provided in the step of providing, further includes a lip projection having a lip projection outer surface that engages the inner facing portion of the cap receiving portion when the cap resides within the top opening; wherein the lip projection includes a lip projection recess in the outer surface of the lip projection that cooperates with the inner facing portion to further define the air vent.

* * * * *